United States Patent
Martínez Morales et al.

(10) Patent No.: US 11,366,285 B2
(45) Date of Patent: *Jun. 21, 2022

(54) UNIVERSAL ELECTRONIC EXCHANGER SYSTEM FOR EYEPIECES, ESPECIALLY FOR TELESCOPES

(71) Applicants: Álvaro Martínez Morales, Barcelona (ES); Fernando López Alcalá-Galiano, Barcelona (ES)

(72) Inventors: Álvaro Martínez Morales, Barcelona (ES); Fernando López Alcalá-Galiano, Barcelona (ES)

( * ) Notice: Subject to any disclaimer, the term of this patent is extended or adjusted under 35 U.S.C. 154(b) by 478 days.

This patent is subject to a terminal disclaimer.

(21) Appl. No.: 15/875,282

(22) Filed: Jan. 19, 2018

(65) Prior Publication Data

US 2018/0172947 A1 Jun. 21, 2018

Related U.S. Application Data

(63) Continuation-in-part of application No. 14/248,995, filed on Apr. 19, 2014, now Pat. No. 9,910,242.

(30) Foreign Application Priority Data

Mar. 17, 2014 (EP) .................................. 14382092

(51) Int. Cl.
*G02B 7/16* (2021.01)
*G02B 23/16* (2006.01)
(Continued)

(52) U.S. Cl.
CPC ............... *G02B 7/16* (2013.01); *G02B 7/023* (2013.01); *G02B 23/16* (2013.01); *G02B 25/001* (2013.01); *H04N 5/2254* (2013.01)

(58) Field of Classification Search
CPC .......... G02B 7/16; G02B 7/023; G02B 23/16; G02B 25/001; G02B 23/00–26; H04N 5/2254
See application file for complete search history.

(56) References Cited

U.S. PATENT DOCUMENTS 5,818,637 A 10/1998 Hoover et al.
2004/0136063 A1 7/2004 Yang
(Continued)

FOREIGN PATENT DOCUMENTS

GB 1484544 A 9/1977

*Primary Examiner* — Alicia M Harrington
(74) *Attorney, Agent, or Firm* — Henry Patent Law Firm PLLC

(57) ABSTRACT

Universal electronic exchange system, especially for coupling to telescopes or similar, which includes an automated rotary device provided with a revolver-type rotary plate provided with a plurality of tubular members with holders for respective optical devices, an electric motor connected to the revolver-type rotary plate for transmission of a rotary movement thereto, an electronic unit for tubular-member selection, wherein the electronic unit is made and arranged to receive a selection signal indicative of a tubular member to be used, wherein the selection signal is used for controlling rotation and stopping of the revolver-type rotary plate, process a speed, angular path of rotation and stopping position of the tubular member to be used, and send a command signal to the electric motor of the revolver-type rotary plate for positioning and aligning the tubular member to be used with the optical axis.

24 Claims, 16 Drawing Sheets

(51) Int. Cl.
G02B 7/02 (2021.01)
H04N 5/225 (2006.01)
G02B 25/00 (2006.01)

(56) References Cited

U.S. PATENT DOCUMENTS

| | | | |
|---|---|---|---|
| 2008/0043235 A1* | 2/2008 | Oldham | G01N 21/6456 356/344 |
| 2010/0060980 A1 | 3/2010 | Suhner | |
| 2016/0025949 A1* | 1/2016 | Platt | G02B 27/30 359/641 |

* cited by examiner

UNIVERSAL ELECTRONIC EXCHANGER SYSTEM FOR EYEPIECES, ESPECIALLY FOR TELESCOPES

CROSS-REFERENCE TO RELATED APPLICATIONS

This patent application is a continuation in part of U.S. patent application Ser. No. 14/248,995, filed Apr. 9, 2014. U.S. patent application Ser. No. 14/248,995 is incorporated by reference herein.

TECHNICAL FIELD

The present invention relates to a universal electronic exchange system for eyepieces, lenses, and any optical device able to be connected to an eyepiece holder or to a lens holder, and is especially intended for telescopes.

BACKGROUND

The problem for amateur astronomers with an economical tripod or mount is changing the eyepieces or lenses of different magnifications. In touching the telescope to extract an eyepiece and insert the next one with a higher or lower magnification, the telescope can sway or move (work is done in the dark) and this can cause the loss of the object being observed or photographed through the telescope.

This problem, which is as common as it is frustrating, is solved by purchasing a heavier, more rigid and precise tripod and mount.

However, the amateur astronomer tends to be reticent about spending money on a new tripod or mount when just starting out with their new hobby, as they would rather invest in other accessory equipment such as cameras, automatic colour filter changers, or other equipment.

The applicant of the present invention, after carrying out a lengthy investigation of more than one year in the market of equipment manufacturers for telescopes on the web pages of specialised stores, the web pages of astronomy equipment manufacturers, and Internet forums specialised in astronomy, has reached the conclusion that currently there is no knowledge of an eyepiece exchange device for telescopes that would allow eyepieces to be changed automatically.

Only one eyepiece changing device of a rotary type has been found, similar to the one used in some microscopes, manufactured by a Japanese company. However, this device does not resolve the fact of having to manually activate the change of eyepieces, and moreover does not include a universal support for image equipment, or a focus compensation system after changing the eyepiece.

Furthermore, the researched astronomy internet forums have specific sections under the heading "eyepiece changer", where enthusiasts search for automatic eyepiece exchange equipment with the answer from the more experienced enthusiasts always being that they simply "do not exist".

Additionally, another typical problem for the market segment of advanced users with remote telescopes (expert amateurs, schools and universities) remotely controlled by a computer and located in areas of difficult access such as mountains or away from the cities, is the impossibility of changing the eyepiece when atmospheric conditions require it (the worse the "seeing" or atmospheric conditions, the lower the magnifications the eyepieces require): and as there are no automatic eyepiece exchangers, these telescopes work with their primary focus without an eyepiece or with a fixed eyepiece, making it impossible to decrease or increase the power according to atmospheric conditions, and diminishing their optical performance.

The above mentioned problems also occur when, instead of eyepieces or lenses, other kinds of optical devices are needed to be changed.

Specifically, for astrophotography, different types of cameras and/or of optical filter assemblies are frequently used to acquire different characteristics of the photographed objects, such as luminance and chrominance. Usually, the user of the telescope must uncouple a first camera from the telescope tube and then couple a second one in place, which can cause the above mentioned undesired sway or move of the telescope.

SUMMARY

The objective of the universal electronic exchange system, especially for telescopes, of the present invention is to resolve the drawbacks presented by prior art, including those associated to the eyepiece exchange devices known in the state of the art and those associated to the lack of exchange systems for other types of optical devices, by providing a totally automated exchange system, without having to manipulate the telescope.

To that end, an aspect of the present invention relates to a universal electronic exchange system, made to couple and operate with a telescope made to view distant objects, the universal electronic exchange system comprising:
   an automated rotary device comprising:
      a base support provided with an opening alignable with an optical axis of a telescope;
      a revolver-type rotary plate coupled on the base support;
   a first tubular member comprising:
      a first holder for an eyepiece or a lens;
   a second tubular member comprising,
      a second holder for an eyepiece or a lens;
   wherein the first and second tubular members are parallel to the optical axis;
   an electric motor connected to the revolver-type rotary plate for transmission of a rotary movement to the revolver-type rotary plate; and
   an electronic unit for tubular-member selection, wherein the electronic unit is made and arranged to:
      receive a selection signal indicative of a tubular member to be used, wherein the tubular member to be used is selected from the first and second tubular members, wherein the selection signal is used for controlling rotation and stopping of the revolver-type rotary plate;
      process a speed, angular path of rotation and stopping position of the tubular member to be used; and
      send a command signal to the electric motor of the revolver-type rotary plate for positioning and aligning the tubular member to be used with the optical axis.

For an embodiment, at least one of the first tubular member and the second tubular member further comprises, respectively, at least one of a first camera connected at least indirectly to the first holder and a second camera connected at least indirectly to the second holder.

The above mentioned first and second cameras can be of any type (preferably each of a different type), such as cameras for photography and/or videography, spectrography, photometry, thermography, or any other kind of imaging device, such as those used in association with image analysis techniques for detecting objects.

Generally, the first and second cameras are of a different type, to acquire different characteristics of the photographed objects or scene, such as a black and white camera for acquiring luminance information and a colour camera for acquiring chrominance information, or cameras of the same type, such as video cameras for the combined use thereof to obtain different frames for subsequent stacking processes and post-process photographic processing, in planetary observations, or long exposure cameras for deep sky astrophotography and also for research processes, such as the detection of exoplanets, by analysis and measurement of the luminosity variations of the object.

According to an embodiment, one or both of the first camera and the second camera comprises at least one of an eyepiece and a lens (such as an objective lens). For a variant of said embodiment, the eyepiece of the camera is a viewfinder.

One or both of the first camera and the second camera is a prime focus camera, for an embodiment.

For an embodiment, one or both of the first camera and the second camera has or is connected to an eyepiece-like coupling arrangement connected to a respective complementary eyepiece-like coupling arrangement of the first holder or of the second holder. In this case, the first and second holders are identified as holders for an eyepiece because they include such a complementary eyepiece-like coupling arrangement.

For another embodiment, one or both of the first camera and the second camera has or is connected to a lens-like coupling arrangement connected to a respective complementary lens-like coupling arrangement of the first holder or of the second holder. In this case, the first and second holders are identified as holders for a lens because they include such a complementary lens-like coupling arrangement.

The system of the present invention further comprises, for an embodiment, a third tubular member parallel to the optical axis and a third holder for an eyepiece or a lens, wherein the selection signal is indicative of a tubular member to be used, wherein the tubular member to be used is selected from the first, second and third tubular members.

For a variant of said embodiment, the system comprises, in addition to the first and second cameras, at least one eyepiece connected at least indirectly to the third holder.

According to an embodiment, the system of the present invention comprises both of the first and second cameras, each including respective connection cables (for electric signals and data transmission) and/or other kind of conductors (such as cooling fluid conductors for the circulation of a cooling fluid for refrigeration purposes), extending out of respective housings of the first and second cameras, wherein the electronic unit is made and arranged to generate and send:

a first command signal to the electric motor of the revolver-type rotary plate for positioning and aligning the first tubular member to be used with the optical axis, by rotating the revolver-type rotary plate according to a first rotation direction; and a second command signal to the electric motor of the revolver-type rotary plate for positioning and aligning the second tubular member to be used with the optical axis, by rotating the revolver-type rotary plate according to a second rotation direction opposite to said first rotation direction, so as to prevent that the connection cables and/or conductors of the cameras tangle to each other.

For another embodiment, the at least one of the first tubular member and the second tubular member further comprises, respectively, at least one of a first optical filter assembly connected at least indirectly to the first holder and a second optical filter assembly connected at least indirectly to the second holder.

For an implementation of said embodiment, the system of the present invention further comprises:

an upper mounting plate; and
a shutter element coupled to the upper mounting plate;
wherein at least one of the first tubular member, the second tubular member, the first optical filter assembly and the second optical filter assembly, is adaptable to achieve appropriate height to make physical contact with the shutter element so as to prevent entrance of ambient light into an interface formed thereby.

Preferably, the upper mounting plate further comprises a connector to a universal coupling device, and wherein the system further comprises at least one optical device including said universal coupling device coupled to that connector.

Optionally, the system of the invention further comprises a plurality of said optical devices interchangeably connected to the connector of the upper mounting plate. Said plurality of optical devices include at least two of the following optical devices: a camera of a first type, a camera of a second type different to the first type, another kind of imaging device, an eyepiece assembly, and an assembly combining at least two of the above mentioned optical devices (such as a camera and an eyepiece).

The above mentioned camera of a first type and camera of a second types can be of any type, such as cameras for photography and/or videography, spectrography, photometry, thermography, or any other kind of imaging device, such as those used in association with analysis techniques for detecting objects (such as for detecting exoplanets).

According to an embodiment, at least one of the first optical filter assembly and the second optical filter assembly has or is connected to an eyepiece-like coupling arrangement connected to a respective complementary eyepiece-like arrangement of the first holder or of the second holder. In this case, the first and second holders are identified as holders for an eyepiece because they include such a complementary eyepiece-like coupling arrangement.

For another embodiment, one or both of the first camera and the second camera has or is connected to a lens-like coupling arrangement connected to a respective complementary lens-like coupling arrangement of the first holder or of the second holder. In this case, the first and second holders are identified as holders for a lens because they include such a complementary lens-like coupling arrangement.

For an embodiment, at least one of the first optical filter assembly and the second optical filter assembly comprises at least one of an eyepiece and a lens.

In addition to the first or second optical filter assemblies, for an embodiment, the system of the present invention further comprises at least one prime focus optical assembly connected at least indirectly to one of the first and second holder.

According to a further embodiment, the system of the present invention further comprises, in addition to the first and/or second optical filter assemblies:

a third tubular member parallel to the optical axis and comprising a third holder, wherein the selection signal is indicative of a tubular member to be used, wherein the tubular member to be used is selected from the first, second and third tubular members; and at least one prime focus optical assembly connected at least indirectly to the third holder.

For an embodiment, the system of the present invention comprising a telescope adapter coupling barrel enclosing the above mentioned opening and projecting from the base support in an opposite direction to the direction through which the tubular members project therefrom, said telescope adapter barrel being made and arranged to couple with a back end of the telescope tube of the telescope.

For an alternative embodiment, the system of the present invention comprises a telescope adapter coupling tube enclosing the above mentioned opening and projecting from the base support in an opposite direction to the direction through which the tubular members project therefrom, said telescope adapter coupling tube being made and arranged to couple with a front end of the telescope tube of the telescope.

For an embodiment, the system of the present invention further comprises an automatic focus correction mechanism for correcting the focus of each optical device (camera, eyepiece, optical filter assembly, etc.) connected to at least the first and second holders, allowing at all times an optimum focus to be provided and to send an actuation order to a motor for controlling a primary focus of the telescope.

For an implementation of said embodiment, the automatic focus correction mechanism comprises an electronic focus compensation unit made to capture individualised data on the focus of each of said optical devices, said electronic focus compensation unit including a processor and a memory storing instructions that when executed by the processor cause the processor to process said individualised captured data to calibrate the optimum focus at all times for each optical device, and to send an actuation order to a primary focus control motor of the telescope in order to carry out said calibration.

It is important to note that calibration of the optimum focus of the system is required for each one of the optical devices mounted on the holders of the exchange system of the present invention. These individualised data on the optimum focus of the system are memorised permanently by the system and are sent to the control motor of the primary focus system in correlation with the optical device in particular selected once the process of selecting and changing the tubular member including a holder and optical device connected thereto in particular has been completed.

Alternatively, the automatic focus correction means can incorporate an autofocus system replacing the system of focusing through calibration and memorised focus data which are sent to the telescope focus motor when the process of changing tubular members has been completed. For an embodiment, the autofocus system is mounted on the exchange system of the present invention by means of a light beam splitter prism of the optical axis of the optical device, a video camera which captures one of the two images produced by the prism and a suitable software which sends an actuation order to a control motor of the primary focus of the telescope or similar once the process of selecting and changing the tubular member including said optical device in particular has been completed.

Alternatively to the above mentioned first and second holders for eyepieces or lenses, in another aspect, the system of the present invention comprises first and second holders for other types of optical devices not including eyepiece-like or lens-like coupling arrangements.

A further aspect of the present invention relates to an apparatus including two of the above described systems of the present invention, one to be coupled to a back end of the telescope tube and another one to the front end thereof.

Specifically, the apparatus of the present invention is intended for operating with a telescope made to view distant objects, wherein the apparatus comprises first and second universal electronic exchange systems respectively made to couple to a back end and a front end of a telescope tube of the telescope, wherein each of said first and second universal electronic exchange systems comprises:

an automated rotary device comprising:
a base support provided with an opening alignable with an optical axis of the telescope;
a revolver-type rotary plate coupled on the base support;
a first tubular member comprising:
a first holder for an eyepiece or a lens,
a second tubular member comprising
a second holder for an eyepiece or a lens;
wherein the first and second tubular members are parallel to the optical axis;
an electric motor connected to the revolver-type rotary plate for transmission of a rotary movement to the revolver-type rotary plate; and
an electronic unit for tubular-member selection, wherein the electronic unit is made and arranged to:
receive a selection signal indicative of a tubular member to be used, wherein the tubular member to be used is selected from the first and second tubular members, wherein the selection signal is used for controlling rotation and stopping of the revolver-type rotary plate;
process a speed, angular path of rotation and stopping position of the tubular member to be used; and
send a command signal to the electric motor of the revolver-type rotary plate for positioning and aligning the tubular member to be used with the optical axis; and wherein both electronic units are electrically and operatively connected to operate cooperatively to synchronize at least the emission of the respective command signals.

For an embodiment, the above mentioned synchronization of the emission of command signals, is implemented as a security mechanism to avoid direct light exposition to an excessive luminosity for the optical device (such as a camera) of the first system, by assuring that a protective optical device (such as an optical filter assembly or a shutter device) of the second system is already aligned with the telescope optical axis before aligning therewith the optical device of the first system.

All the above and below described embodiments of the exchange system of the present invention are valid for describing corresponding embodiments of the exchange systems of the apparatus of this further aspect of the invention, some of them to be coupled to the front end of the telescope and some others to be coupled to the back end of the telescope.

For another aspect, the universal electronic exchange system for eyepieces, especially for telescopes, object of the present invention, comprises:
an automated rotary device which includes a base support provided with an opening alignable with the optical axis of a telescope or similar, a rotary plate of the revolver type coupled on said base support, provided with a plurality of eyepiece holders intended to receive different sizes of eyepieces, and actuation means for said rotary plate,
an electronic unit for selection of the eyepiece to be used capable of receiving a selection signal generated by a user from a hand control or similar device, processing said selection signal by means of a suitable software to determine the aligned position in respect to the optical axis provided for the eyepiece to be used, and sending a command signal to an electronic unit for controlling the rotation and stopping of the rotary plate, wherein said electronic unit for controlling the rotation and stopping of the rotary plate is capable of processing by means of a suitable software the speed, angular path of rotation and stopping position of the eyepiece to be used, and sending a command signal to the actuation means of said rotary plate for positioning and aligning with precision said eyepiece with the optical axis.

In this way, thanks to the system of the invention the exchange of eyepieces is achieved in an automated manner without the need for direct handling of the telescope on the part of the user, guaranteeing at all times an adequate optical performance, irrespective of the atmospheric conditions.

Also, the system of the invention is compatible with the eyepieces of any eyepiece manufacturer in their corresponding diameters (1.25 inches, 2 inches and other diameters), therefore being a universal eyepiece exchanger.

Advantageously, the system further comprises a telescopic adjustment device for equalling the height of the different sizes of eyepieces housed on the rotary plate.

Preferably, said telescopic adjustment device for equalling the height of different eyepiece sizes, includes a set of adapter elements intended to hold in their upper part the respective eyepieces, each adapter element in turn being slidable telescopically over the respective eyepiece holder, or on an intermediate telescopic element which is in turn slidable on the respective eyepiece holder.

Advantageously, each adapter element includes a retaining element, preferably a screw or similar, for fixing and regulating the height of the respective eyepiece.

In the same way, each eyepiece holder includes a retaining element, preferably a screw or similar, for fixing and regulating the height of the respective adapter element or the respective intermediate telescopic element.

Advantageously, the rotary plate includes a plurality of cavities provided with joining means, preferably by threading, for coupling of the respective eyepieces holders.

Preferably, the actuation means of the rotary plate comprise an electric motor connected to the rotary plate through means of transmission of the rotary movement and friction means for controlling the speed and stopping of said rotary plate.

Advantageously, the system further comprises an upper mounting plate arranged above the set of eyepieces of the rotary plate, which can be adjusted in height by means of a telescopic adjustment device.

In a preferred embodiment, the telescopic adjustment device of the height of the upper mounting plate comprises at least one telescopic rod, preferably three rods, coupled between said upper mounting plate and the base support of the rotary plate, and can be regulated in height by means of a locking element, preferably a screw or similar.

Advantageously, the upper mounting plate comprises a cavity provided for coupling a shutter device for the eyepiece to be used.

Preferably, the shutter device of the eyepiece to be used comprises a movable shutter element coupled in a displaceable manner within the cavity of the upper mounting plate and mounted concentrically with the optical axis of the telescope or similar, and actuation means capable of coupling said movable shutter element with the eyepiece in use to prevent any light from entering, and capable of uncoupling said movable shutter element in respect to said eyepiece before starting the movement of the rotary plate for the next exchange of eyepieces.

According to a first embodiment, the actuation means of the movable shutter element comprise a set of solenoids coupled to the upper mounting plate and mounted with their respective axes substantially parallel to the optical axis, and connection elements, preferably pins, for transmission of the movement from the axes of the solenoids to the movable shutter element, in such a way that when the solenoids are electrically activated said movable shutter element is moved towards the eyepiece in use until they couple together, and comprising additionally return means, preferably springs, provided for automatically uncoupling the movable shutter element when the solenoids are deactivated or in the case of a fault in the power supply.

According to a second embodiment, the actuation means of the movable shutter element comprise a set of solenoids coupled to the upper mounting plate and mounted with their respective axes substantially perpendicular to the optical axis, and connection elements, preferably pairs of wedge-shaped cams slidable between each other, for transmission of the movement from the axes of the solenoids to the movable shutter element, in such a way that when the solenoids are electrically activated said movable shutter element is moved towards the eyepiece in use until they couple together, and comprising additionally return means, preferably springs, provided for automatically uncoupling the movable shutter element when the solenoids are deactivated or in the case of a fault in the power supply.

Optionally, the upper mounting plate further comprises means for connection to a universal coupling device for image capture apparatus, such as photographic cameras, video cameras or similar.

Advantageously, the system further comprises automatic means for correcting the focus of each eyepiece allowing at all times an optimum focus to be provided and to send an actuation order to a motor for controlling the primary focus of the telescope or similar.

In another aspect, the present invention relates to a telescope made to view distant objects, comprising at least one of the above described universal electronic exchange system of the invention, or the apparatus of the present invention.

Specifically, the telescope of the present invention comprises at least one universal electronic exchange system that comprises:
an automated rotary device comprising:
a base support provided with an opening alignable with an optical axis of a telescope, and coupled to the back end or to the front end of the telescope tube (as described above);
a revolver-type rotary plate coupled on the base support;
a first tubular member comprising:
a first holder for an eyepiece or a lens;
a second tubular member comprising
a second holder for an eyepiece or a lens;
wherein the first and second tubular members are parallel to the optical axis;
an electric motor connected to the revolver-type rotary plate for transmission of a rotary movement to the revolver-type rotary plate; and
an electronic unit for tubular-member selection, wherein the electronic unit is made and arranged to:
receive a selection signal indicative of a tubular member to be used, wherein the tubular member to be used is selected from the first and second tubular members, wherein the selection signal is used for controlling rotation and stopping of the revolver-type rotary plate;

process a speed, angular path of rotation and stopping position of the tubular member to be used; and send a command signal to the electric motor of the revolver-type rotary plate for positioning and aligning the tubular member to be used with the optical axis.

For an embodiment, the telescope of the present invention comprises the apparatus of the present invention, including two exchange systems: one coupled to the back end of the telescope and another one coupled to the front end of the telescope.

All the above described embodiments of the exchange system(s) of the present invention are valid for describing corresponding embodiments of the exchange system(s) of the telescope of the present invention.

The term telescope is used in the present document to refer to any kind of telescope or telescopic device known or to be known in the art, including, but not limited to, astronomic telescopes, astrophotography telescopes, telescopic lenses or sights for cameras or for firearms, etc.

BRIEF DESCRIPTION OF THE DRAWINGS

With a view to facilitating the description of that set out above a set of drawings is attached where schematically and merely by way of a non-limiting example, several practical cases of embodiment are represented of the universal electronic exchange system, especially for telescopes, of the invention, wherein.

DESCRIPTION OF SEVERAL EMBODIMENTS

Figure 1:
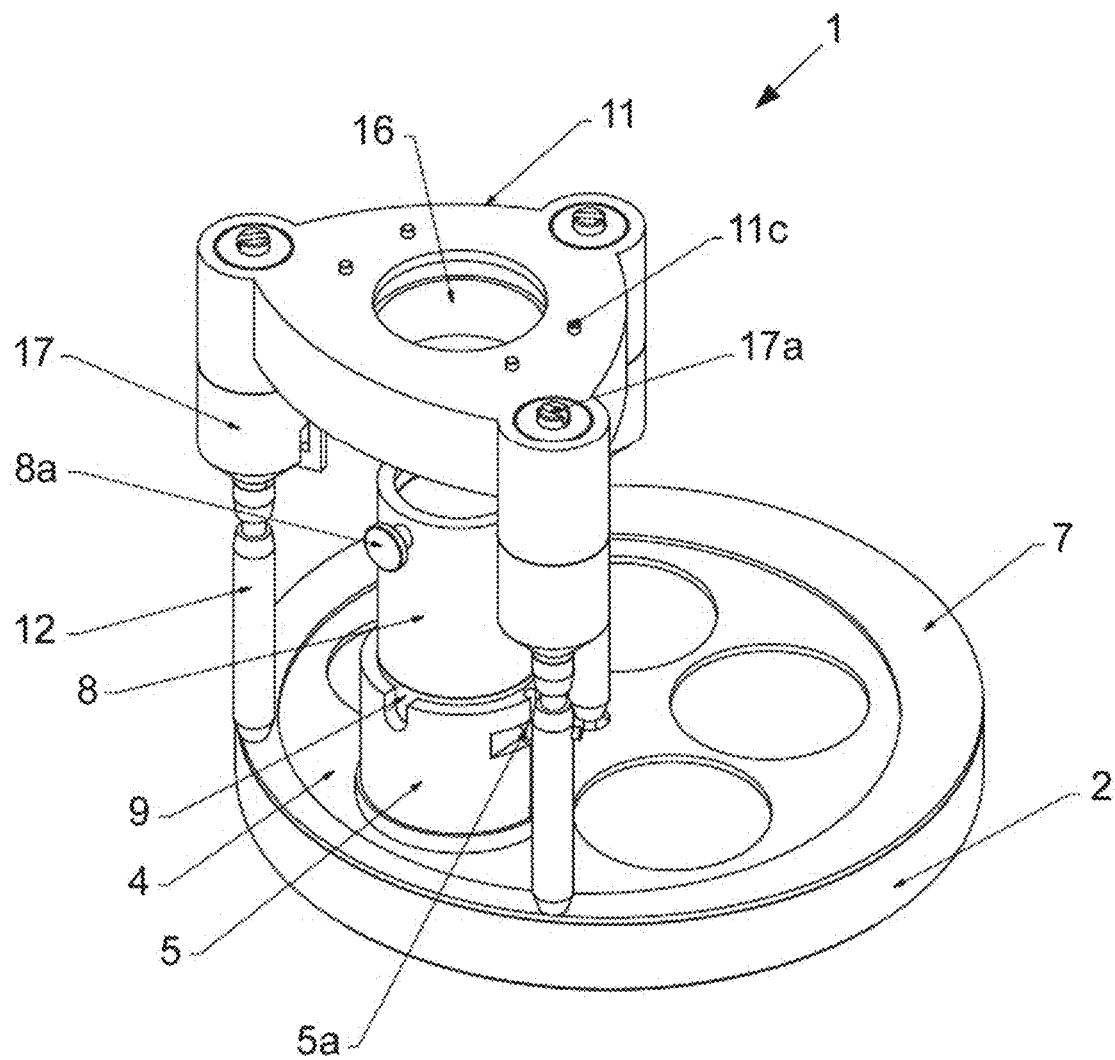
FIG. 1 is an upper perspective view of the exchange system for eyepieces of an aspect of the present invention, according to a first embodiment of the actuation means of the shutter device.
Figure 2:
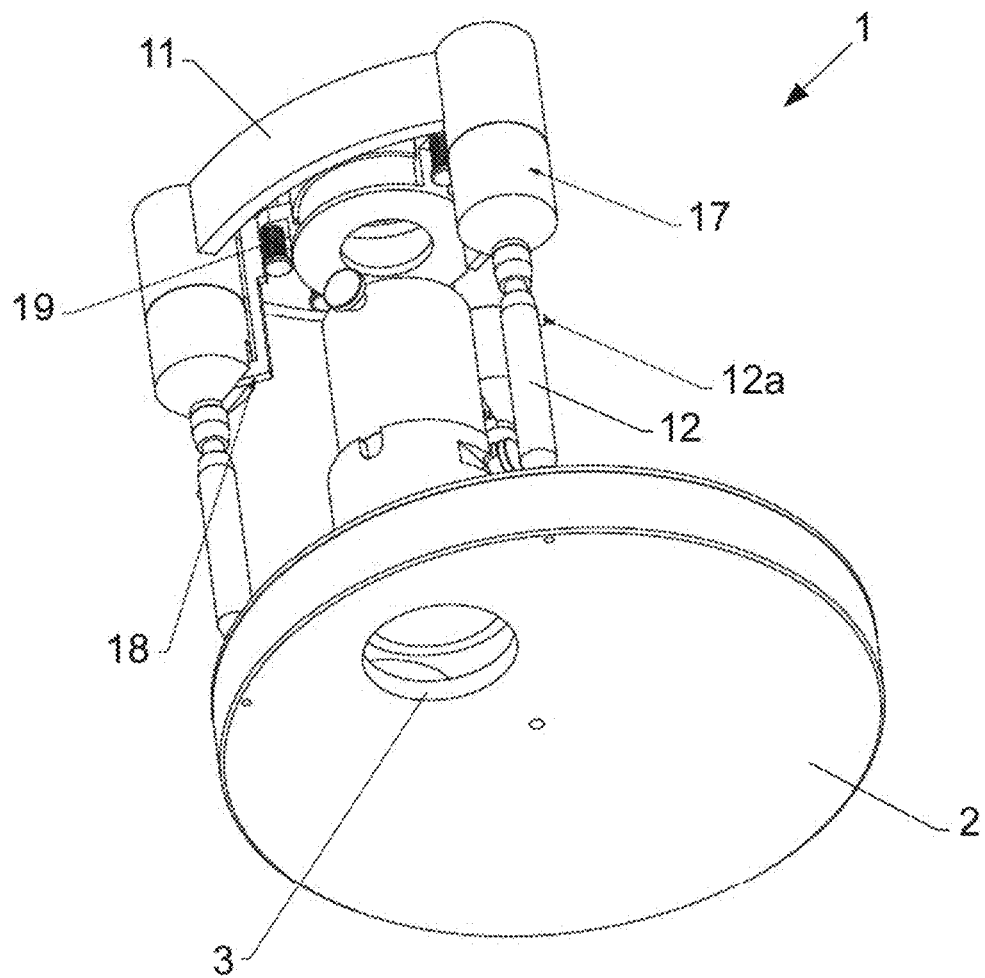
FIG. 2 is a lower perspective view of the exchanger system for eyepieces shown in FIG. 1.

In reference to FIGS. 1 and 2, the universal electronic exchange system 1 for eyepieces, especially for telescopes, object of an aspect of the present invention, comprises an automated rotary device which includes a base support 2 provided with an opening 3 alignable with the optical axis of a telescope or similar, a rotary plate 4 of the revolver type coupled on said base support 2, provided with a plurality of eyepiece holders 5 intended to receive different sizes of eyepieces, and actuation means (not shown) for said rotary plate 4.

The actuation means of the rotary plate 4 comprise an electric motor connected to the rotary plate 4 through means of transmission of the rotary movement and friction means for controlling the speed and stopping of said rotary plate 4. According to a preferred embodiment, said transmission means can include a toothed wheel mounted on the shaft of the motor that transmits the movement of rotation to the rotary plate 4 of the eyepieces by means of a reduction gear and a pressure system between the drive wheel and the rotary plate 4.

Figure 3:
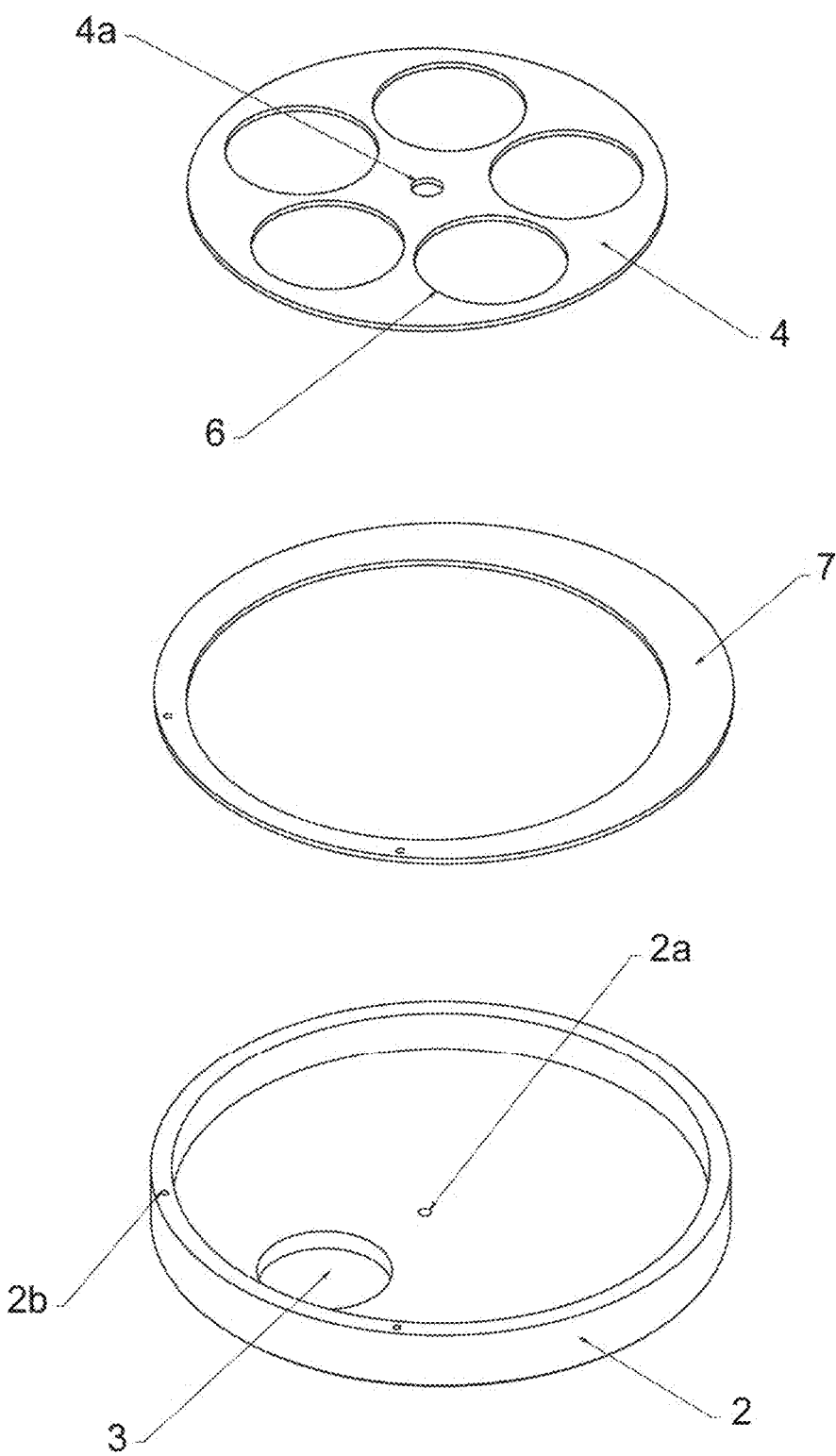
FIG. 3 is an exploded perspective view of the base support of the rotary device, showing an adjustment cap and the rotary plate provided with cavities for coupling the eyepieces.

As can be appreciated from FIG. 3, the rotary plate 4 includes a plurality of cavities 6 for coupling of the respective eyepiece holders 5, and can have a capacity for three, four or five eyepiece holders 5 or any other appropriate combination by means of a standard thread coupling.

Likewise, the rotary plate 4 is mounted with the capacity to rotate on an annular adjustment cap 7, which is coupled in turn on the base support 2. Also, both the base support 2 and the rotary plate 4 include respective orifices 2a and 4a respectively provided for housing the axis of rotation of the rotary plate 4.

The exchange system 1 for eyepieces of the invention further includes an electronic unit for selection of the eyepiece to be used capable of receiving a selection signal generated by a user from a hand control, via cable, wireless or the support PC or any other analogous system, processing said selection signal by means of appropriate software to determine the aligned position in respect to the optical axis provided for the eyepiece to be used, and sending a command signal to an electronic unit for controlling the rotation and stopping of the rotary plate.

Said electronic unit for controlling the rotation and stopping of the rotary plate is capable of processing by means of a suitable software the speed, angular path of rotation and stopping position of the eyepiece to be used, and sending a command signal to the actuation means of said rotary plate for positioning and aligning with precision said eyepiece with the optical axis.

The power supply to the system 1 is provided by means of a 12 V do charger from the general power supply of 110 V ac-250 V ac.

Figure 4:
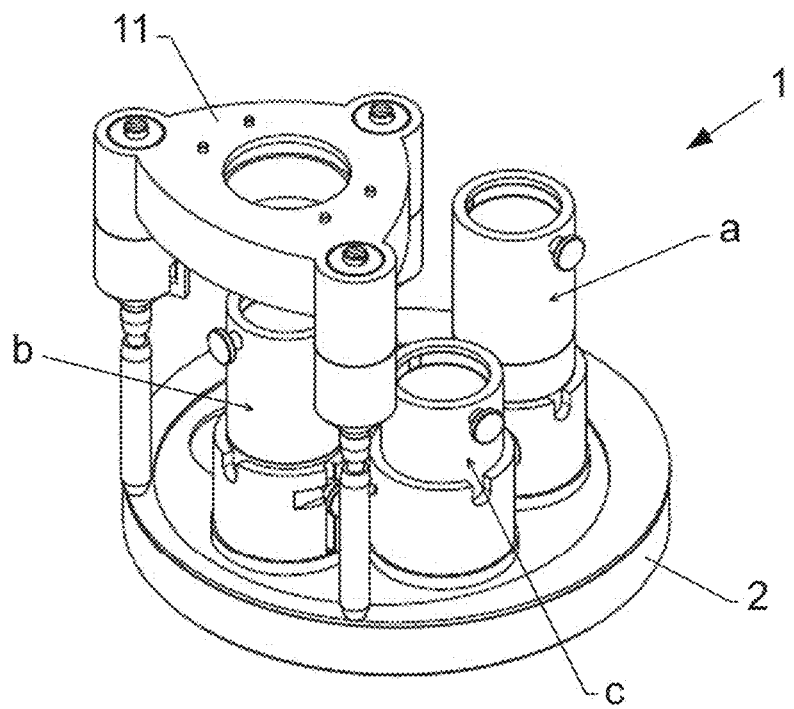
FIGS. 4 and 5 show a perspective and an elevation view respectively of the exchange system for eyepieces showing three eyepieces of different sizes in length mounted on the rotary plate, and regulated in height by means of the respective telescopic adjustment device.
Figure 5:
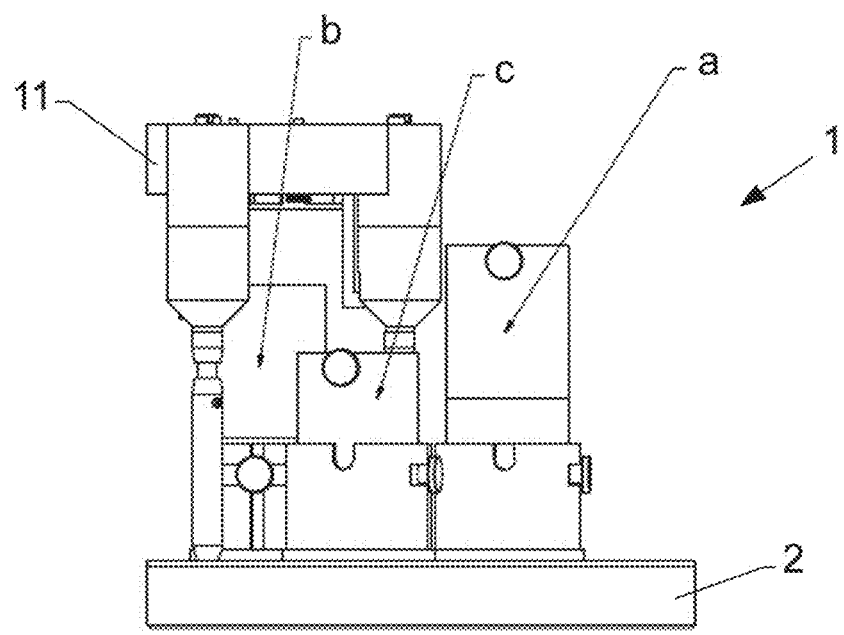
Figure 6:
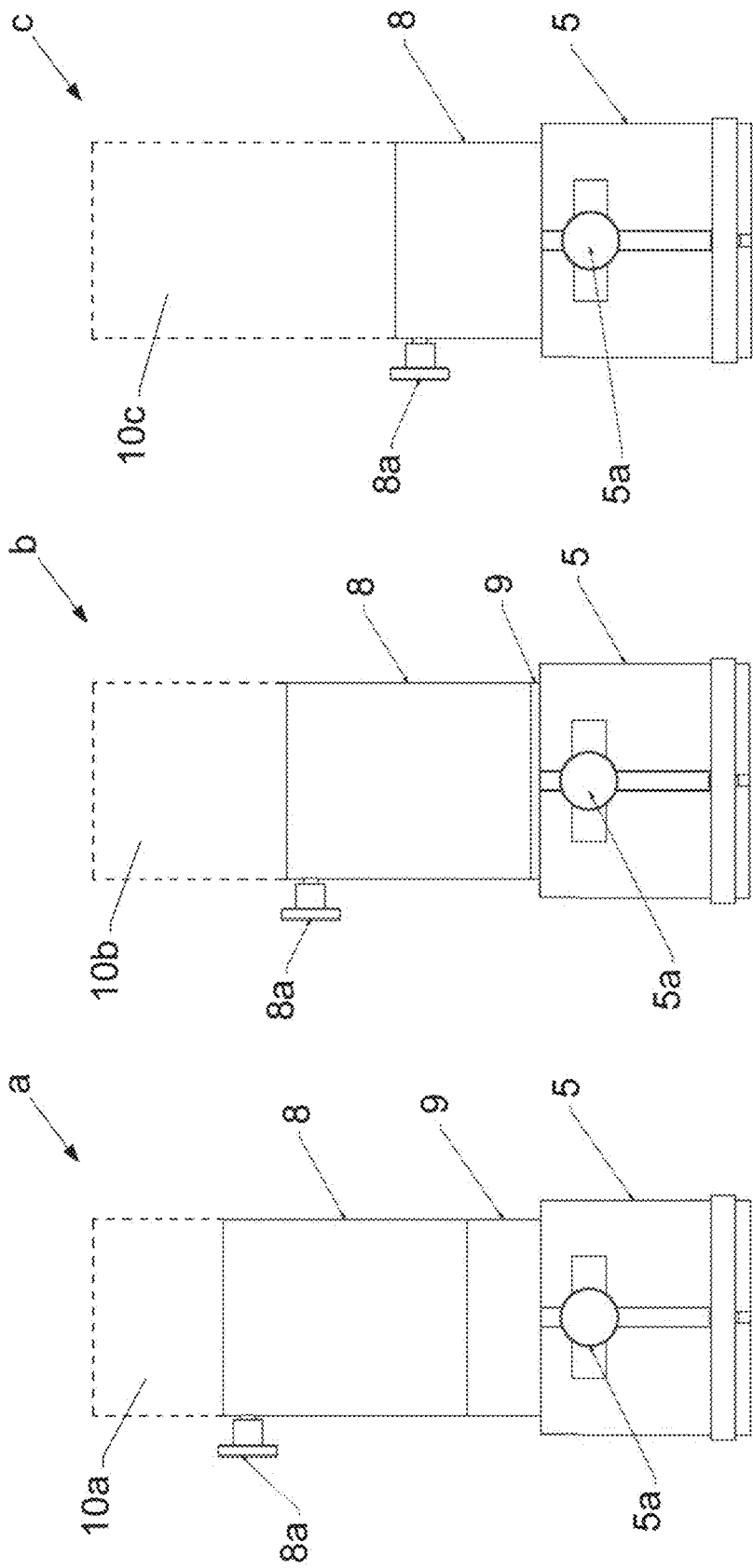
FIGS. 6*a* to 6*c* are elevation views of three eyepieces of different sizes in length respectively, mounted on the respective eyepiece holder and regulated in height by means of said telescopic adjustment device.

In reference to FIGS. 4 to 6, the exchange system 1 further comprises a telescopic adjustment device for equalling the height of the different sizes of eyepieces housed on the rotary plate 4.

FIGS. 4 and 5 illustrate an example with three positions a-c corresponding to three types of eyepieces 10a-10c of different sizes in length (illustrated schematically with a dashed line in FIGS. 6a-6c) mounted on the rotary plate 4 and regulated in height by means of said telescopic adjustment device, in such a way that the total height of the three eyepieces 10a-10c can be equalled, as described below.

The telescopic adjustment device is made up of a set of tubular adapter elements 8 intended to hold in their upper part the standard male connection of the respective eyepieces 10a-10c, each adapter element 8 in turn being telescopically slidable over the respective eyepiece holder 5 or over an intermediate tubular telescopic element 9 which is in turn slidable over the respective eyepiece holder 5.

Further, each adapter element 8 includes a retaining screw 8a in a lateral position and accessible to the user, for fixing and regulating the height of the respective eyepiece 10a-10c. Similarly, each eyepiece holder 5 includes a retaining screw 5a for fixing and regulating the height of the respective adapter element 8 or the respective intermediate telescopic element 9.

FIG. 6a shows a high position "a" for a small-sized eyepiece 10a mounted in the eyepiece holder 5 using an adapter element 8 and an intermediate telescopic element 9, said intermediate telescopic element 9 being regulated to an appropriate height by means of a retaining screw 5a of the eyepiece holder 5.

FIG. 6b shows an intermediate position "b" for a medium-sized eyepiece 10b mounted in the eyepiece holder 5 using an adapter element 8 and an intermediate telescopic element 9, said intermediate telescopic element 9 being regulated to a lower height than in the previous case of FIG. 6a.

FIG. 6c shows a low position "c" for a large-sized eyepiece 10a mounted in the eyepiece holder 5 using an adapter element 8 regulated to a lower height than in the previous cases of FIGS. 6a and 6b. It must be noted that in this case the use of an intermediate telescopic element 9 is not necessary.

Figure 12:
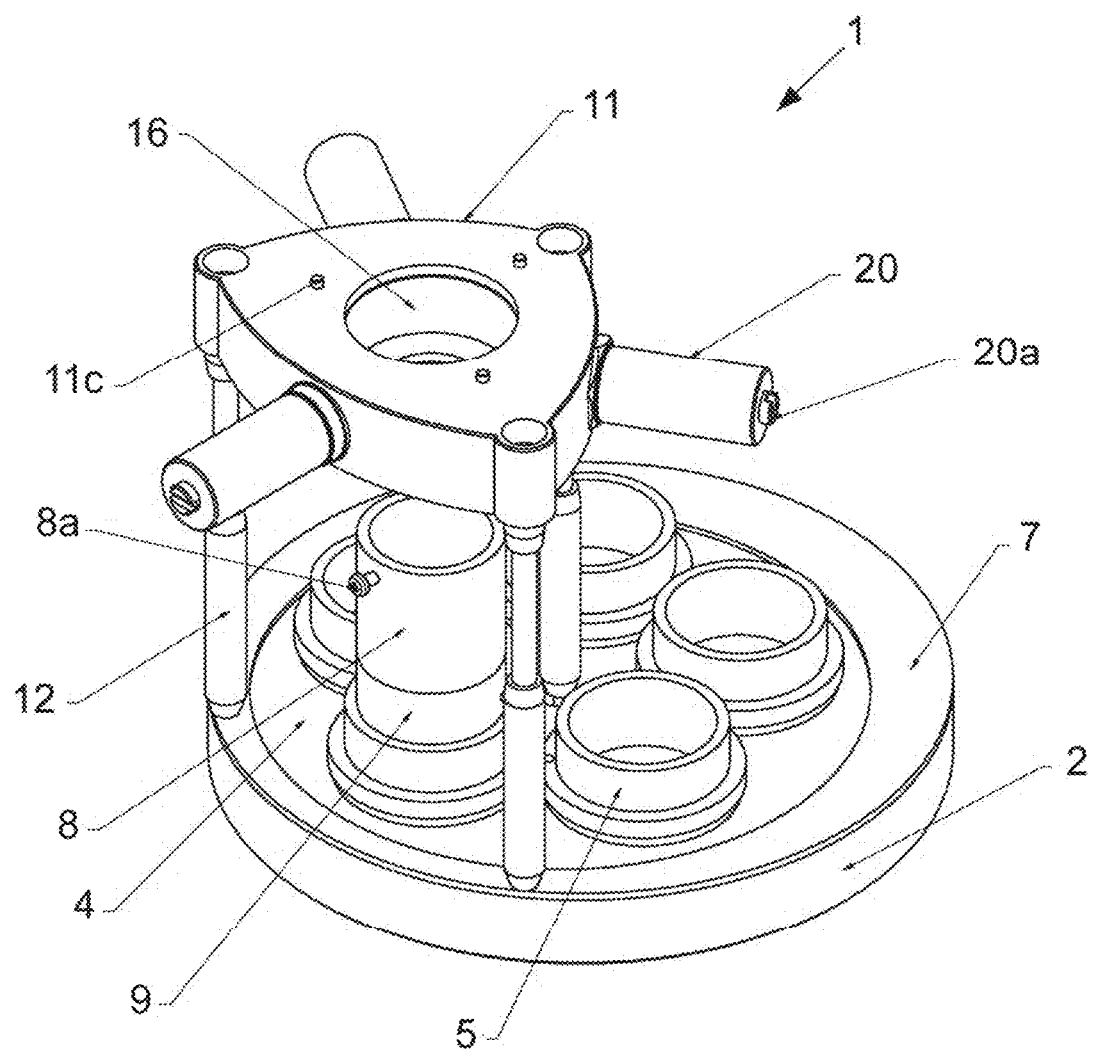
FIG. 12 is an upper perspective view of the exchange system for eyepieces, according to a second embodiment of the actuation means of the shutter device.
Figure 13:
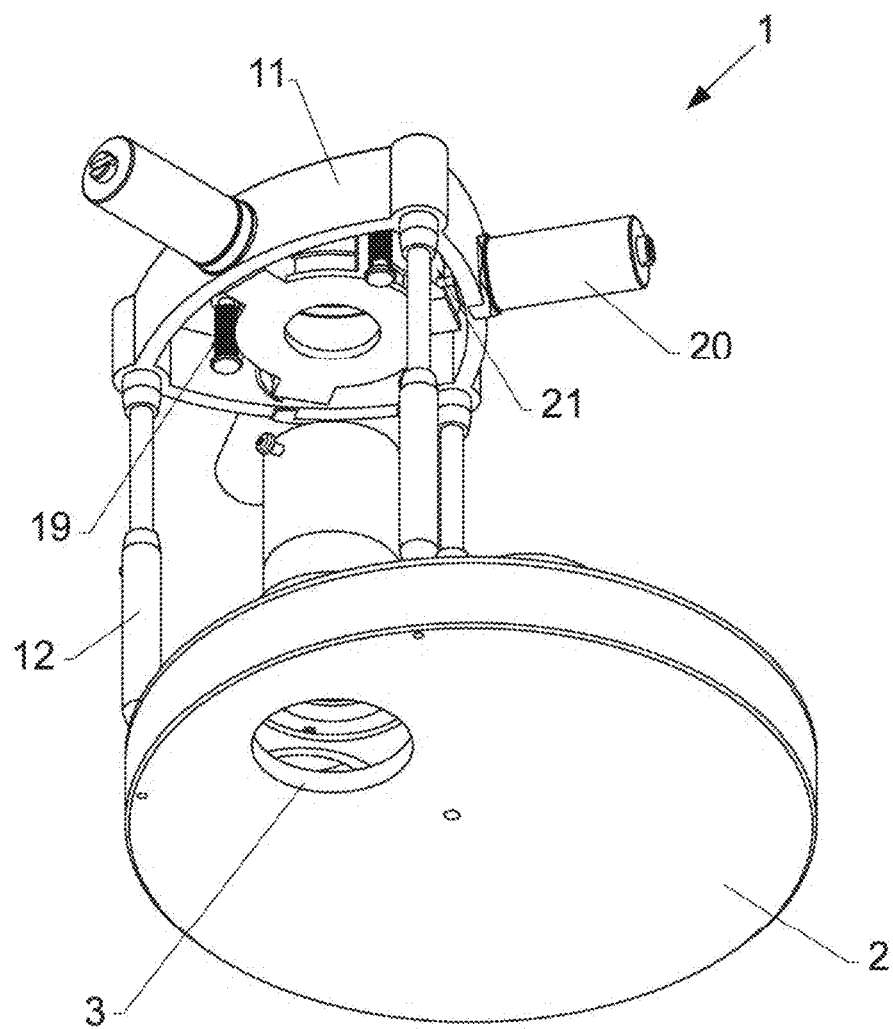
FIG. 13 is a lower perspective view of the exchanger system for eyepieces shown in FIG. 12.

As may be appreciated for example in FIG. 1 or 12, the exchange system 1 for eyepieces of the invention further comprises an upper mounting plate 11 arranged above the set of eyepieces of the rotary plate 4 which can be regulated in height by means of a telescopic adjustment device made up of a set of three or more telescopic rods 12 coupled between said upper mounting plate 11 and the base support 2 of the rotary plate 4, and can be regulated in height by means of a locking screw 12a in a lateral position and accessible to the user.

Figure 7:
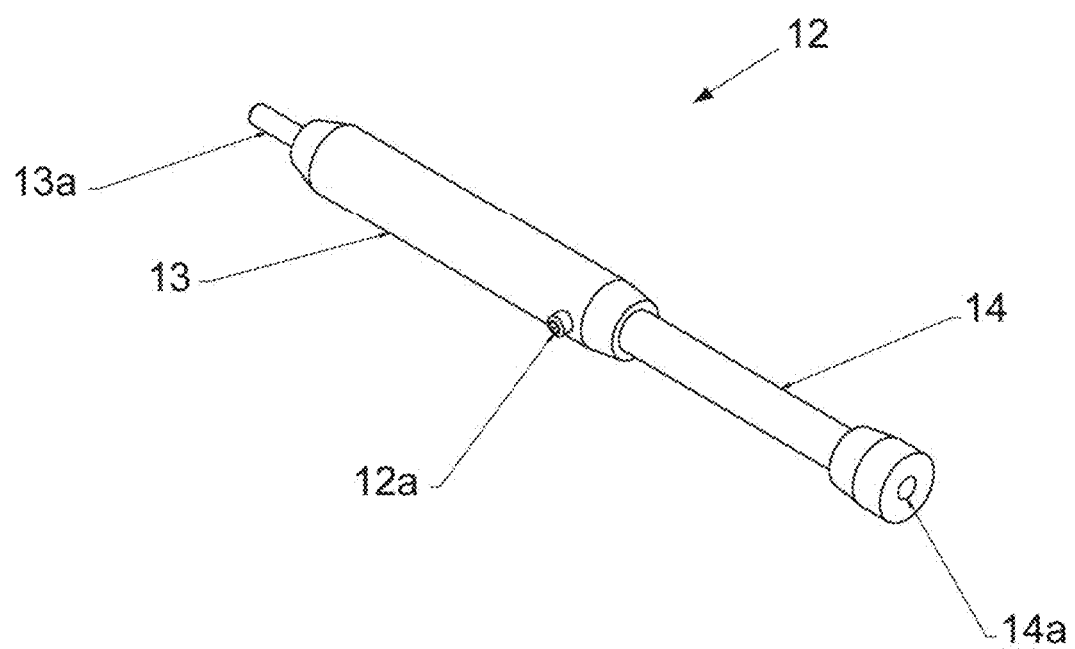
FIG. 7 is a perspective view of a telescopic rod belonging to the device for telescopic adjustment of the height of the upper mounting plate.
Figure 14:
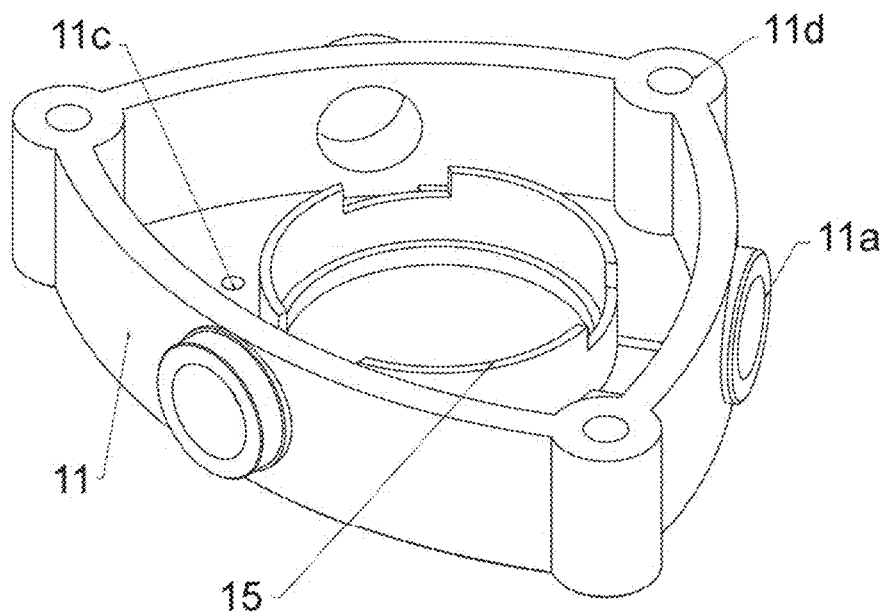
FIG. 14 is a lower perspective view of the upper mounting plate according to a second embodiment of the actuation means of the shutter device.

More specifically, as can be appreciated from FIG. 7, each telescopic rod 12 comprises a body 13 coupled by its end 13a in a housing 2b of the base support 2 (see FIG. 3), and a shaft 14 mounted sliding within said body 13 fixed by one end 14a in a housing 11d of the upper mounting plate 11 (see FIG. 14).

Figure 8:
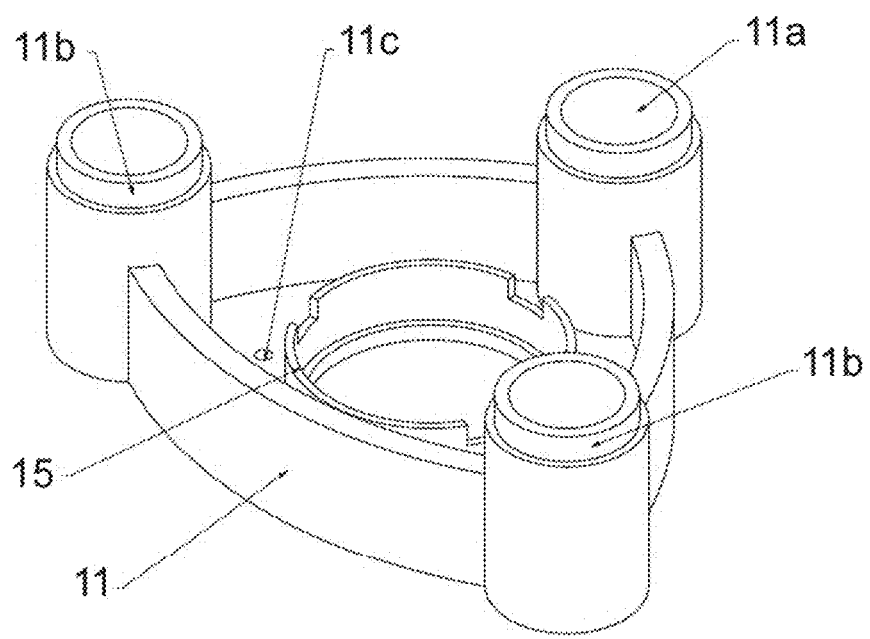
FIG. 8 is a lower perspective view of the upper mounting plate according to a first embodiment of the actuation means of the shutter device.
Figure 9:
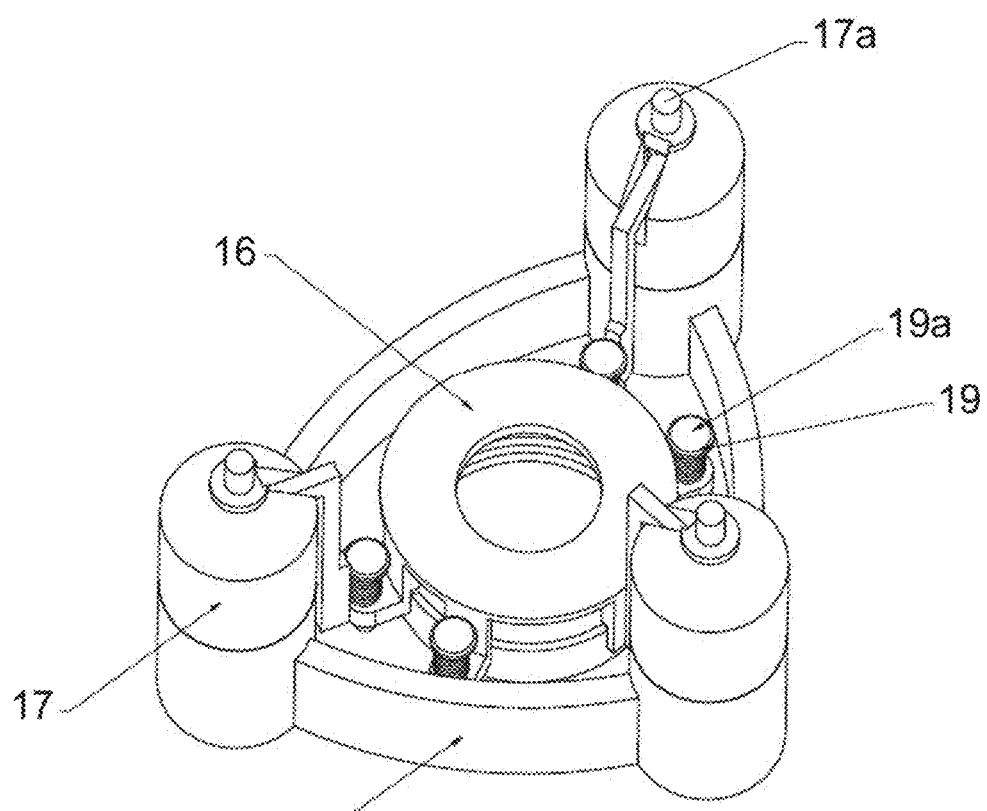
FIG. 9 is a lower perspective view of the upper mounting plate showing also the movable shutter element and its respective actuation means according to the first embodiment.

As can be appreciated for example in FIGS. 8 and 9, the upper mounting plate 11 comprises a cavity 15 provided for the coupling of a shutter device of the eyepiece to be used, which is made up of a movable shutter element 16 coupled in a displaceable manner within said cavity 15 of the upper mounting plate 11 and mounted concentrically with the optical axis of the telescope or similar.

In the position at rest said movable shutter element 16 is uncoupled from the eyepiece in use and therefore allows the free rotation of the rotary plate 4 to carry out the change of eyepieces. When the exchange system 1 of eyepieces is powered the movabie shutter element 16 displaces until making physical contact with the eyepiece in use, in such a way as to prevent ambient light from affecting the system. Likewise, it includes braking means which guarantee that, in any position of the system 1, there is no misalignment of the optical axis due to different positions of the masses of the eyepieces and of the rotary device in general.

The displacement of the movable shutter element 16 is carried out through the action of actuation means capable of coupling the shutter element 16 with the eyepiece in use, thus preventing any light from entering, and capable of uncoupling the movable shutter element 16 in respect to said eyepiece before starting the movement of the rotary plate 4 for the next exchange of eyepieces.

According to a first embodiment shown in FIGS. 1, 2 and 8 to 11, the actuation means of the movable shutter element 16 comprise a set of solenoids 17 coupled to the upper mounting plate 11 in respective housings 11a and mounted with their respective axes 17a substantially parallel to the optical axis. It also comprises connection means, preferably pins 18, for transmission of the movement from the axes 17a of the solenoids 17 to the movable shutter element 16 in such a way that when the solenoids 17 are electrically activated said movable shutter element 16 is displaced towards the eyepiece in use until they couple together.

Figure 10:
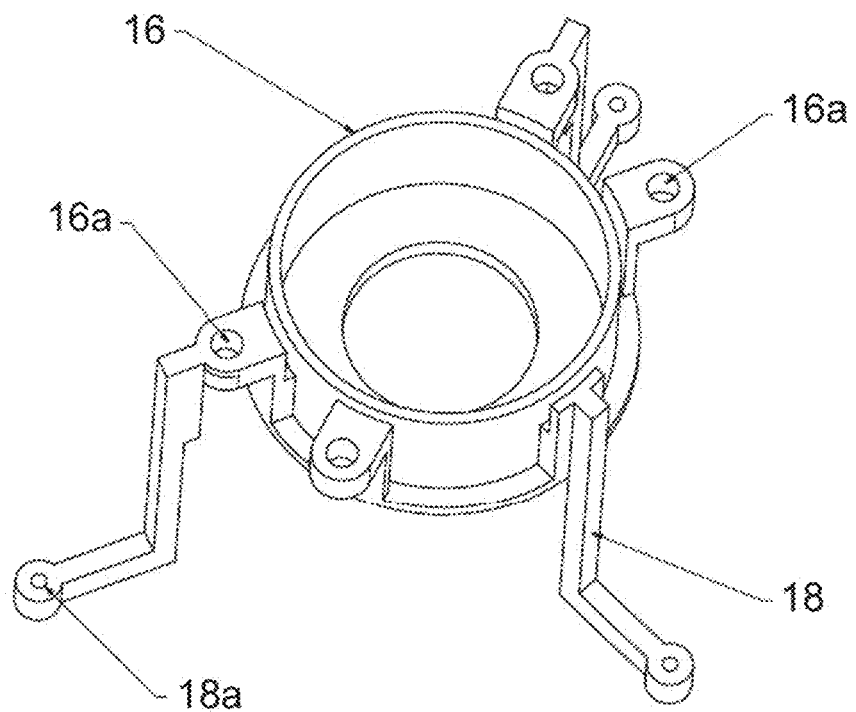
FIG. 10 is an upper perspective view of the movable shutter element according to the first embodiment.
Figure 11:
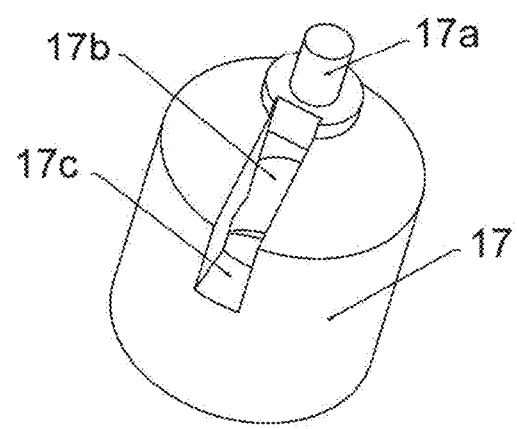
FIG. 11 is a perspective view of the configuration of a solenoid according to the first embodiment.

In reference to FIG. 11, each solenoid 17 includes a thread 17b coupled to a complementary thread 11b of the housing 11a of the upper mounting plate 11 (see FIG. 8) and a groove 17c made in said body of the solenoid 17 provided for passage of the end of the respective pin 18, each pin 18 being provided in turn at their end with an orifice 18a for coupling with the axis of the solenoid 17 (see FIGS. 9 and 10).

Also, said actuation means comprise return means, preferably springs 19, provided for automatically uncoupling the movable shutter element 16 when the solenoids 17 are deactivated or in the case of a fault in the power supply. Each return spring 19 is mounted around a bolt joined at one end to the upper mounting plate 11 in respective housings 11c, the travel of said return spring 19 being delimited between a support surface of the movable shutter element 16 and a stopper 19a disposed on the free end of said bolt. Said support surface includes a guide orifice 16a through which the respective bolt slides, allowing the linear displacement of the movable shutter element 16.

When the solenoids 17 are activated, the movable shutter element 16 displaces until reaching the eyepiece in use at the same time as the return springs 19 are compressed. In contrast, when the solenoids 17 are deactivated whether because the system of selection, rotation and positioning of an eyepiece is in progress or because there is a fault in the power supply to the system, said return springs 19 act by uncoupling the movable shutter element 16 which allows a free and even manual actuation of the system to carry out the selection and positioning of the eyepieces.

According to a second embodiment shown in FIGS. 12 to 17, the actuation means of the movable shutter element 16 comprise a set of solenoids 20 coupled to the upper mounting plate 11 in respective housings 11a and mounted with their respective axes 20a substantially perpendicular to the optical axis, and connection elements, preferably pairs of cams 21, 22 wedge-shaped and slidable between each other, for the transmission of movement from the axes 20a of the solenoids 20 to the movable shutter element 16 in such a way that when the solenoids 20 are electrically activated said movable shutter element 16 is displaced towards the eyepiece in use until they couple together.

Figure 15:
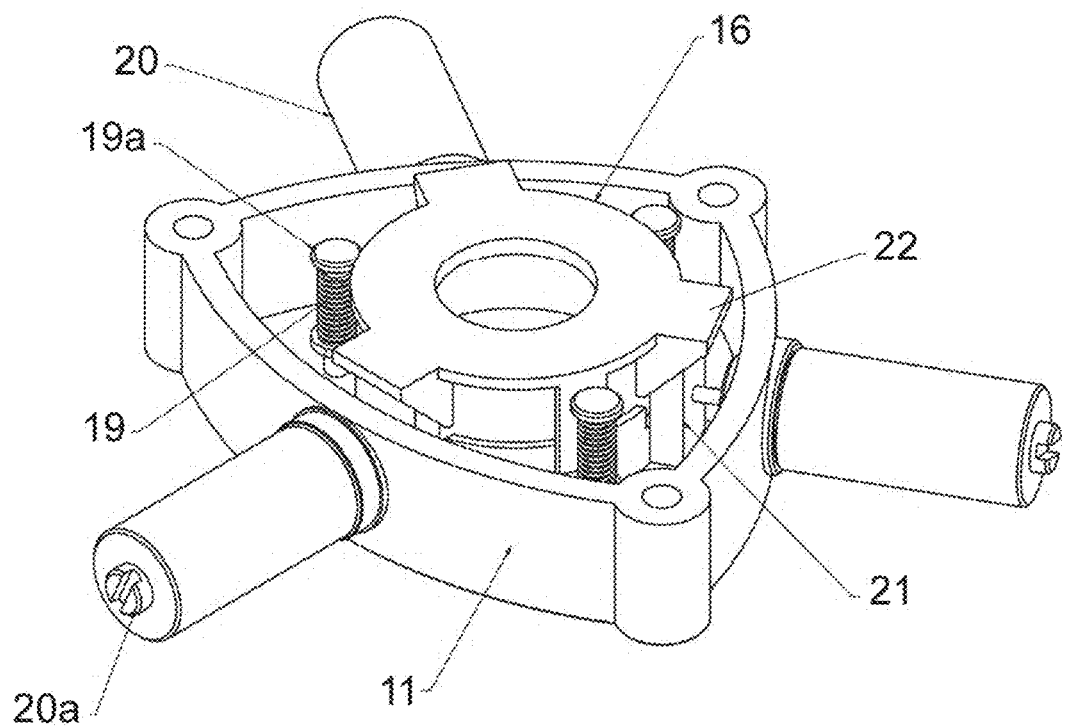
FIG. 15 is a lower perspective view of the upper mounting plate showing also the movable shutter element and its respective actuation means according to the second embodiment.
Figure 16:
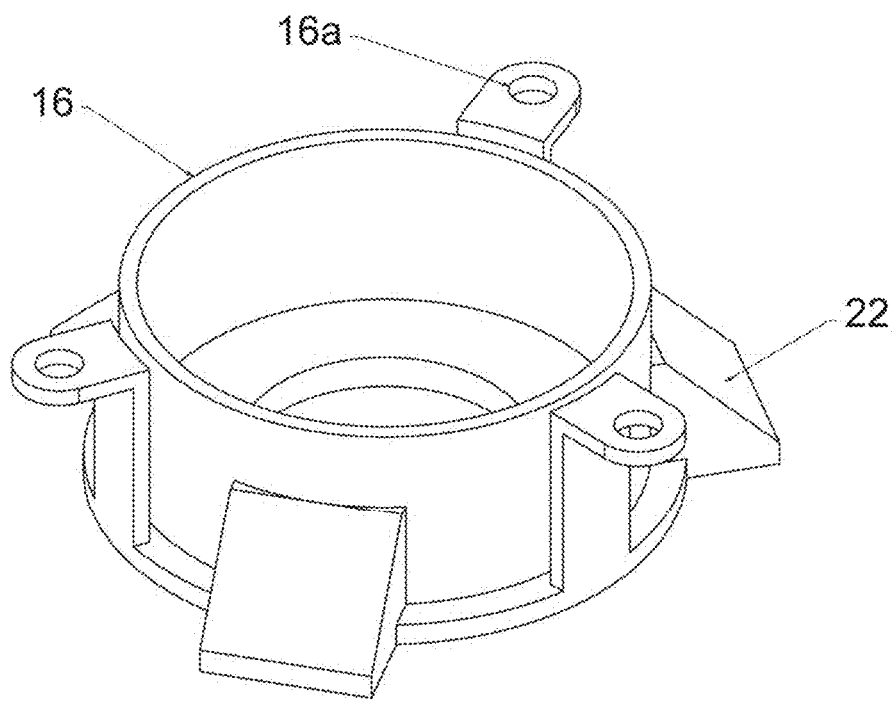
FIG. 16 is an upper perspective view of the movable shutter element showing its respective wedge-shaped cams, according to the second embodiment.
Figure 17:
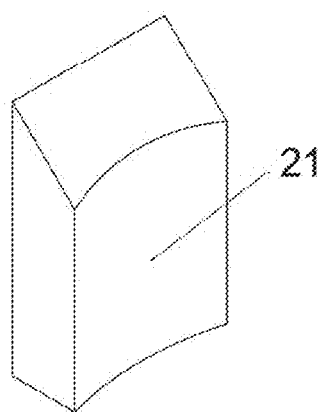
FIG. 17 is a perspective view of one of the complementary cams associated to the corresponding solenoid axes, according to the second embodiment.

In reference to FIGS. 15 to 17, each pair of cams includes a driving cam 21 facing the axis 20a of the solenoid 20 (see FIG. 15) and a driven cam 22 joined to the movable shutter element 16 capable of being displaced thanks to the mutual wedge sliding, thus allowing the linear displacement of said moveable shutter element 16.

In the same way, said actuation means comprise return means, preferably springs 19, provided for automatically uncoupling the movable shutter element 16 when the solenoids 20 are deactivated or in the case of a fault in the power supply.

The upper mounting plate 11 further comprises connection means (not shown) to a universal coupling device for image capture apparatus, such as photographic cameras, video cameras or similar, including other devices used in astronomy for complementary mounting to the image devices such as filters, filter exchange carousels, off-axis guide systems, adaptive optics, etc. Generally, said connection means consist of a plate with a standard threaded device for photographic cameras, video cameras and other image systems, which is integrated into the upper mounting plate 11.

The exchange system 1 for eyepieces of the invention further comprises automatic means for correcting the focus of each eyepiece.

According to one embodiment, the automatic focus correction means include an electronic focus compensation unit (not shown) capable of capturing individualised data on the focus of each eyepiece, processing said information by means of a suitable software which allows the optimum focus to be calibrated at all times for each eyepiece, and sending an actuation order to a primary focus control motor of the telescope or similar in order to carry out said calibration. Said unit has a memory for each eyepiece in particular.

It is important to note that calibration of the optimum focus of the system is required for each one of the eyepieces mounted on the eyepiece exchange system 1. These individualised data on the optimum focus of the system are memorised permanently by the system and are sent to the control motor of the primary focus system in correlation with the eyepiece in particular selected once the process of selecting and changing said eyepiece in particular has been completed.

Alternatively, the automatic focus correction means can incorporate an autofocus system replacing the system of focusing through calibration and memorised focus data which are sent to the telescope focus motor when the process of changing eyepieces has been completed. The autofocus system is mounted on the exchange system 1 by means of a light beam splitter prism of the optical axis of the eyepiece, a video camera which captures one of the two images produced by the prism and a suitable software which sends an actuation order to a control motor of the primary focus of the telescope or similar once the process of selecting and changing said eyepiece in particular has been completed.

Figure 18:
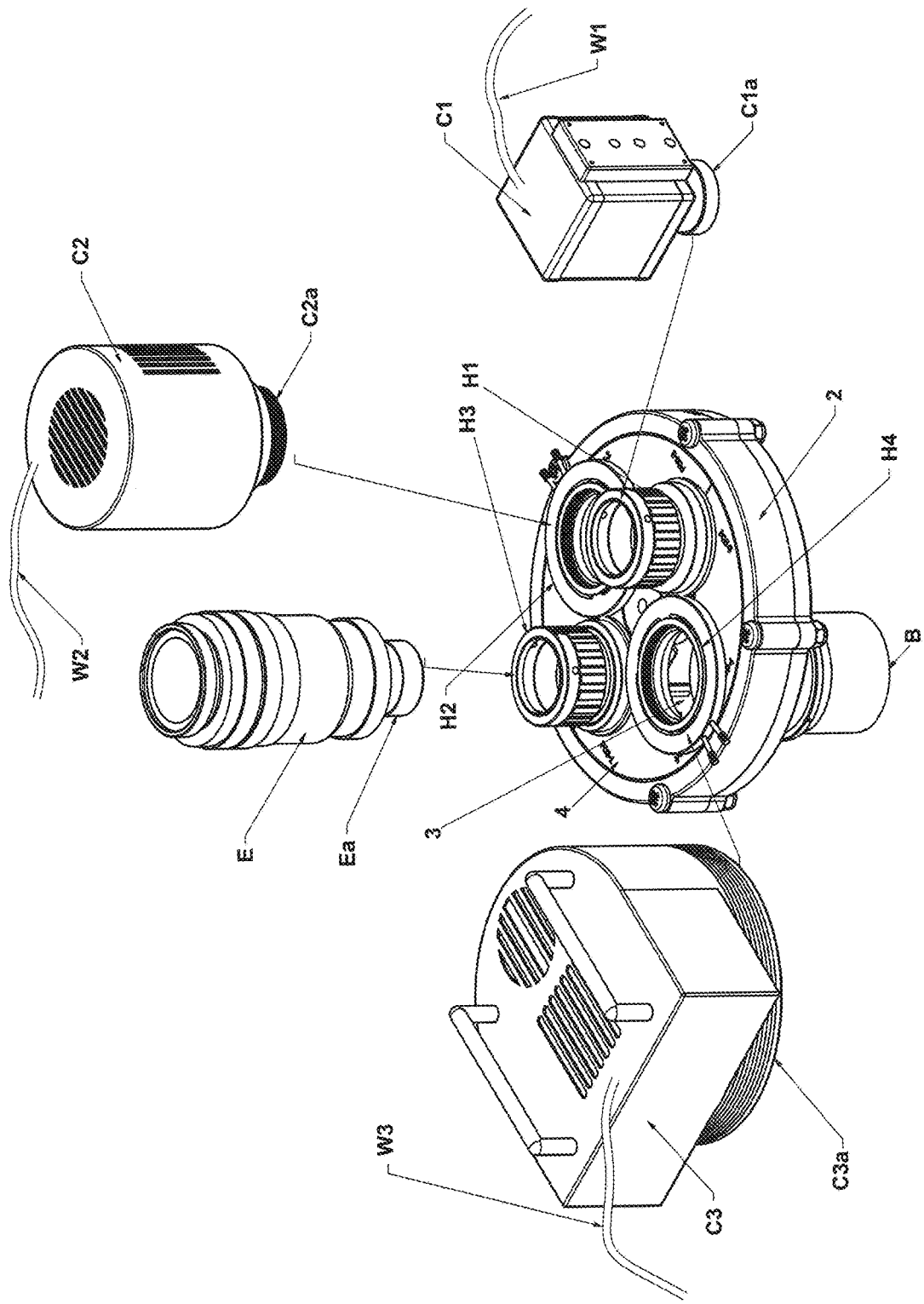
FIG. 18 is an upper perspective view showing another aspect of the present invention, for an embodiment for which the exchange system is for exchanging different types of cameras, and also, an eyepiece, depicted in respective uncoupled positions with respect to the different holders of the rotary plate.
Figure 19:
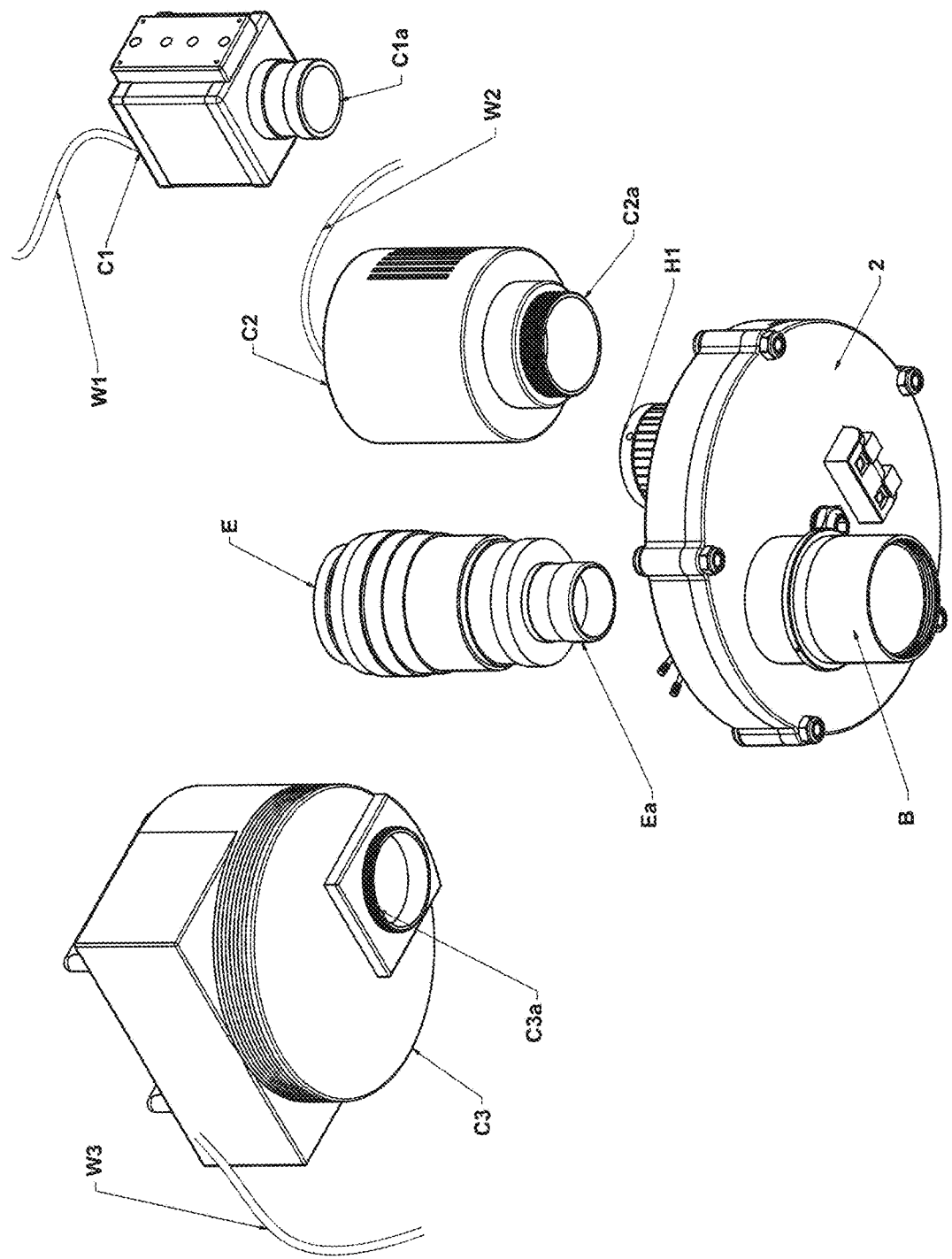
FIG. 19 is a lower perspective view of the elements shown in FIG. 18.
Figure 20:
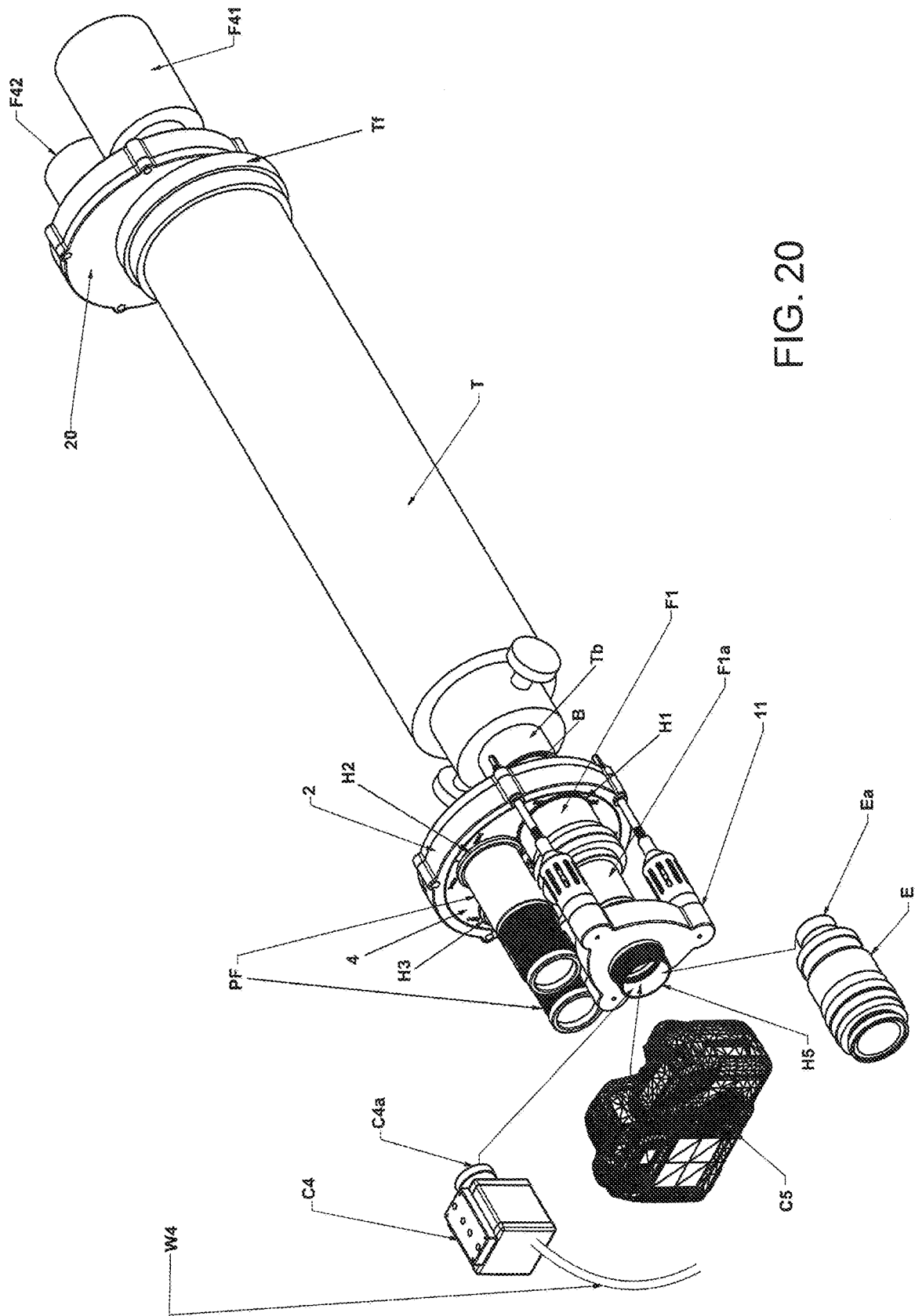
FIG. 20 is a perspective view taken from the left side, showing different aspects of the present invention, including, two exchange systems, one being coupled to the back end of a telescope tube and intended for exchanging optical filter assemblies, such as ethalon filters, and prime focus optical assemblies, and another coupled to the front end of the telescope tube and intended for exchanging optical filter assemblies, such as ethalon filters, the apparatus including those two systems, and the telescope including the apparatus, for some embodiments.
Figure 21:
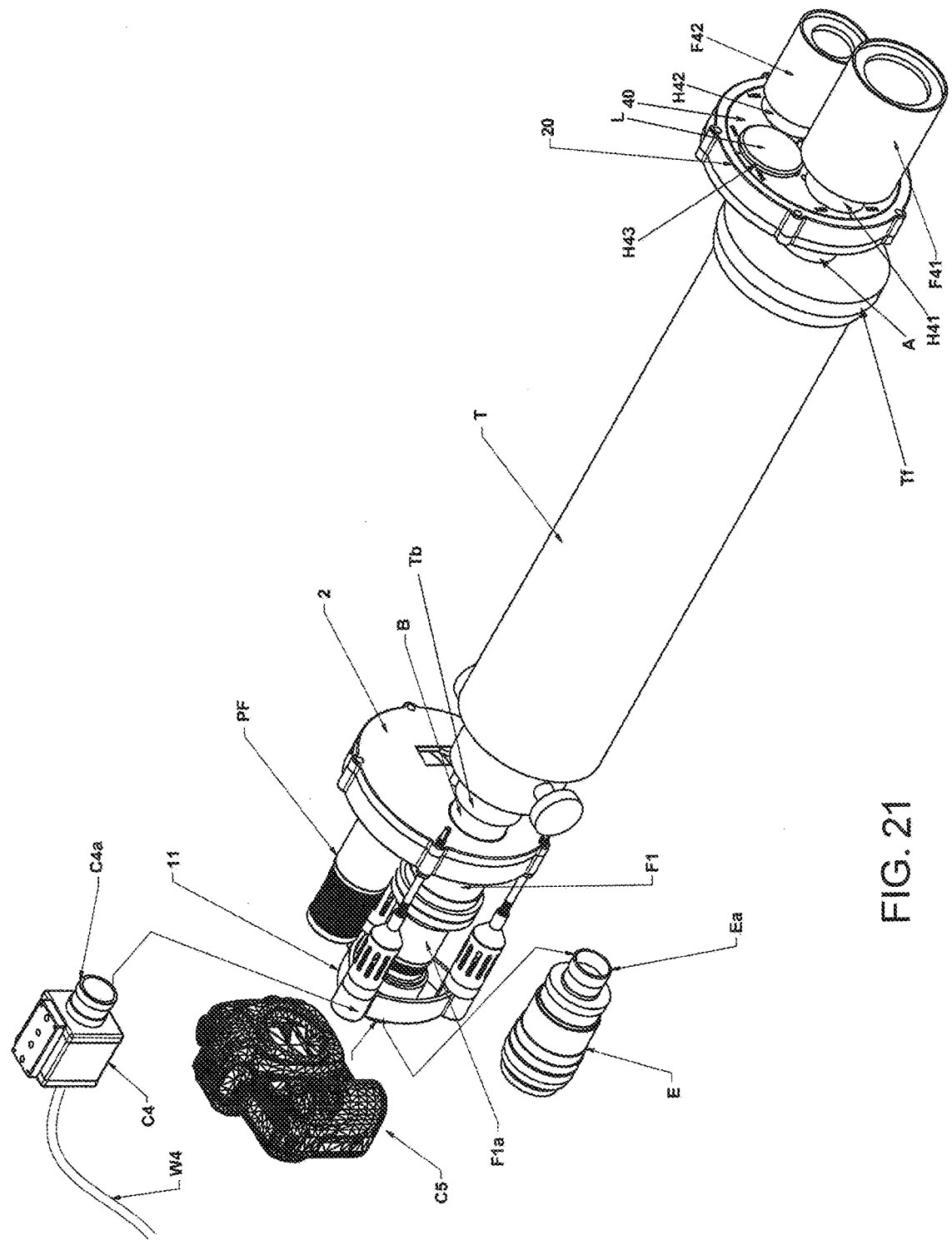
FIG. 21 shows the same elements as in FIG. 20 but by means of perspective view taken from the right side.

A further aspect of the present invention is shown in FIGS. 18 to 21, for an embodiment, shown in FIGS. 18 and 19, for which the exchange system is for exchanging different types of cameras and, optionally, an eyepiece (for a non-illustrated embodiment, the system is intended for exchanging only cameras), and for embodiments, shown in FIGS. 20 and 21, for which the system is for exchanging different optical filter assemblies and, optionally, also prime focus optical assemblies.

Note that FIGS. 20 and 21 show two exchange systems, representing two different embodiments of the system of the invention, an embodiment of the apparatus of the invention (that comprises two exchange systems), and an embodiments of the telescope of the invention.

For the embodiment shown in FIGS. 18 and 19, the universal electronic exchange system of the present invention comprises:
  an automated rotary device comprising:
    a base support 2 provided with an opening 3 alignable with an optical axis of a telescope;
    a revolver-type rotary plate 4 coupled on the base support 3;
  a first tubular member comprising:
    a first camera C1 of a first type;
    a first holder H1 connected to the first camera C1 by inserting tightly camera adapter C3a (usually having a diameter of 1.25" or of 2", or more) into an opening defined by first holder H1;
  a second tubular member comprising:
    a second camera C2 of a second type;
    a second holder H2 connected to the second camera C2 by inserting and screwing camera adapter C2a into an opening defined by second holder H2; a third tubular member comprising:
    an eyepiece E;
    a third holder H3 connected to the eyepiece E by inserting tightly camera adapter C2a into an opening defined by second holder H2;
  a fourth tubular member comprising:
    a third camera C3 of a third type;
    a fourth holder H4 connected to the third camera C3 by inserting and screwing camera adapter C3a into an opening defined by fourth holder H4;
  wherein the first, second, third and fourth tubular members are parallel to the optical axis;
  an electric motor (not shown) connected to the revolver-type rotary plate 4 for transmission of a rotary movement to the revolver-type rotary plate 4; and an electronic unit (not shown) for tubular-member selection, wherein the electronic unit is made and arranged to.
  receive a selection signal indicative of a tubular member to be used, wherein the tubular member to be used is selected from the first, second, third and fourth tubular members, wherein the selection signal is used for controlling rotation and stopping of the revolver-type rotary plate 4;
  process a speed, angular path of rotation and stopping position of the tubular member to be used; and
  send a command signal to the electric motor of the revolver-type rotary plate 4 for positioning and aligning the tubular member to be used with the optical axis.

For a non-illustrated embodiment only two or three of the above identified optical devices C1, C2, C3 and H2, are included in the system of the invention, together with corresponding two or three holders.

For the embodiment shown in FIGS. 18 and 19, first H1 and third H3 holders comprise eyepiece-like coupling arrangement, so that whether an eyepiece E or a camera C1 with a complementary eyepiece-like coupling arrangement (such as that of adapter C1a) can be coupled thereto, while second H2 and fourth H4 holders comprise non-eyepiece-like coupling arrangements.

As shown in FIGS. 18 and 19, the system comprises a telescope adapter coupling barrel B enclosing opening 3 and projecting from the base support 2 in an opposite direction to the direction through which the tubular members project therefrom. Said telescope adapter coupling barrel B is made and arranged to couple with a back end of the telescope tube of the telescope.

For the illustrated embodiment, the first C1, second C2 and third C3 cameras include respective connection cables and/or conductors W1, W2, W3 extending out of respective housings thereof, and in order to prevent that the connection cables and/or conductors W1, W2, W3 tangle to each other, the electronic unit (not shown) is made and arranged to make the revolver-type rotary plate 4 rotate according to opposite first and second rotation directions: one direction for going from the first camera C1 towards the third camera C3, and another direction for going from the third camera C3 towards the first camera C1.

In FIGS. 20 and 21, two exchange systems defined according to two respective embodiments of the present invention are shown.

Specifically, a first exchange system comprising:
  a base support 2 provided with an opening 3 alignable with an optical axis of a telescope, and a telescope adapter coupling barrel B made and arranged to couple with a back end Tb of the telescope tube T of the telescope;
  a revolver-type rotary plate 4 coupled on the base support 3;
  a first tubular member comprising:
    a first optical filter assembly F1;
    a first holder H1 connected to the first optical filter assembly F1;
  a second tubular member comprising:
    a prime focus optical assembly PF;
    a second holder H2 connected to the prime focus optical assembly PF;
  a third tubular member comprising:
    a prime focus optical assembly PF;
    a third holder H3 connected to the prime focus optical assembly PF;
  wherein the first, second and third tubular members are parallel to the optical axis;
  an upper mounting plate 11; and
  a shutter element (not shown) coupled to the upper mounting plate 11;
  wherein the prime focus optical assemblies. PF and the optical filter assembly (in this case, by means of adapter F1a) are adaptable to achieve appropriate height to make physical contact with the shutter element so as to prevent entrance of ambient light into an interface formed thereby;
  an electric motor (not shown) connected to the revolver-type rotary plate 4 for transmission of a rotary movement to the revolver-type rotary plate 4; and
  an electronic unit (not shown) for tubular-member selection, wherein the electronic unit is made and arranged to:
    receive a selection signal indicative of a tubular member to be used, wherein the tubular member to be used is selected from the first, second, third and fourth tubular members, wherein the selection signal is used for controlling rotation and stopping of the revolver-type rotary plate 4;
    process a speed, angular path of rotation and stopping position of the tubular member to be used; and
    send a command signal to the electric motor of the revolver-type rotary plate 4 for positioning and aligning the tubular member to be used with the optical axis.

For the embodiment shown in FIGS. 20 and 21, the upper mounting plate 11 further comprises a connector H5 to a universal coupling device, and the system further comprises a plurality of optical devices interchangeably connected to the connector H5, particularly two cameras C4, C5 of different types, and an eyepiece E.

A second exchange system is shown in FIGS. 19 and 21, differing from the first system in that the second exchange system comprises a telescope adapter coupling tube A made and arranged to couple with a front end Tf of the telescope tube T, and in that two different optical filter assemblies F41, F42, and a lid L, are respectively connected to the first H41, second H42 and third H43 holders.

FIGS. 20 and 21 also illustrate an apparatus including the two illustrated exchange systems, wherein electronic units (not shown) of both exchange systems are electrically and operatively connected to operate cooperatively to synchronize at least the emission of the respective command signals, and also a telescope including the apparatus, with the first exchange system coupled to the back end Tb of the telescope tube T and the second exchange system coupled to the front end Tf.

Despite the fact that reference has been made to a specific embodiment of the invention, it is obvious for a person skilled in the art that the described universal electronic exchange system for eyepieces, especially for telescopes is susceptible to several variations and modifications, and that all the aforementioned details can be substituted for others which are technically equivalent, without deviating from the scope of protection defined by the attached claims.

The invention claimed is:

1. A universal electronic exchange system, made to couple and operate with a telescope made to view distant objects, the universal electronic exchange system comprising:
  an automated rotary device comprising:
    a base support provided with an opening alignable with an optical axis of a telescope;

a revolver-type rotary plate coupled on the base support;
a first tubular member comprising:
a first holder for an eyepiece or a lens;
a first optical device connected at least indirectly to said first holder;
a second tubular member comprising
a second holder for an eyepiece or a lens;
a second optical device connected at least indirectly to said second holder;
wherein said second optical device is different from the first optical device;
wherein at least one of said first and second optical devices is not a lens;
wherein the first and second tubular members are parallel to the optical axis;
wherein the first tubular member and the second tubular member extend from different locations of an upper face of the revolver-type rotary plate so that for all positions adoptable by the revolver-type rotary plate:
the longitudinal axis of the first tubular member and the longitudinal axis of the second tubular member are not mutually aligned; and
the optical axis of the first optical device and the optical axis of the second optical device are not mutually aligned;
an electric motor connected to the revolver-type rotary plate for transmission of a rotary movement to the revolver-type rotary plate; and
an electronic unit for tubular-member selection, wherein the electronic unit is made and arranged to:
receive a selection signal indicative of a tubular member to be used, wherein the tubular member to be used is selected from the first and second tubular members, only one at a time, wherein the selection signal is used for controlling rotation and stopping of the revolver-type rotary plate;
process a speed, angular path of rotation and stopping position of the tubular member to be used; and
send a command signal to the electric motor of the revolver-type rotary plate for positioning and aligning the tubular member to be used with the optical axis.

2. The system according to claim 1, wherein at least one of the first and second optical devices is a camera.

3. The system according to claim 2, wherein the camera comprises at least one of an eyepiece and a lens.

4. The system according to claim 3, wherein said eyepiece is a viewfinder.

5. The system according to claim 2, wherein the camera is a prime focus camera.

6. The system according to claim 2, wherein the camera has or is connected to an eyepiece coupling arrangement connected to a respective complementary eyepiece-like coupling arrangement of the first holder or of the second holder.

7. The system according to claim 2, further comprising a third tubular member parallel to the optical axis and comprising a third holder for an eyepiece or a lens, wherein the selection signal is indicative of a tubular member to be used, wherein the tubular member to be used is selected from the first, second and third tubular members.

8. The system according to claim 7, further comprising, in addition to the camera, at least one eyepiece connected at least indirectly to the third holder.

9. The system of claim 2, wherein the first optical device and the second optical device are first and second cameras, each including respective connection cables and/or other kind of conductors, extending out of respective housings of the first and second cameras, wherein the electronic unit is made and arranged to generate and send:
a first command signal to the electric motor of the revolver-type rotary plate for positioning and aligning the first tubular member to be used with the optical axis, by rotating the revolver-type rotary plate according to a first rotation direction; and
a second command signal to the electric motor of the revolver-type rotary plate for positioning and aligning the second tubular member to be used with the optical axis, by rotating the revolver-type rotary plate according to a second rotation direction opposite to said first rotation direction.

10. The system according to claim 1, wherein at least one of the first tubular member and the second tubular member further comprises, respectively, at least one of a first optical filter assembly connected at least indirectly to the first holder and a second optical filter assembly connected at least indirectly to the second holder.

11. The system according to claim 10, wherein at least one of the first optical filter assembly and the second optical filter assembly has or is connected to an eyepiece coupling arrangement connected to a respective complementary eyepiece arrangement of the first holder or of the second holder.

12. The system according to claim 10, wherein at least one of the first optical filter assembly and the second optical filter assembly comprises at least one of an eyepiece and a lens.

13. The system according to claim 10, further comprising:
an upper mounting plate; and
a shutter element coupled to the upper mounting plate; and
wherein at least one of the first tubular member, the second tubular member, the first optical filter assembly and the second optical filter assembly, is adaptable to achieve appropriate height to make physical contact with the shutter element so as to prevent entrance of ambient light into an interface formed thereby.

14. The system according to claim 13, wherein the upper mounting plate further comprises a connector to a universal coupling device, and wherein the system further comprises at least one optical device including said universal coupling device coupled to said connector.

15. The system according to claim 14, comprising a plurality of said optical devices interchangeably connected to the connector of the upper mounting plate.

16. The system according to claim 15, wherein said plurality of optical devices include at least two of the following optical devices: a camera of a first type, a camera of a second type different to the first type, an imaging device made to be used in association with image analysis techniques for detecting objects, an eyepiece assembly, and an assembly combining at least two of the above mentioned optical devices.

17. The system according to claim 13, further comprising at least one prime focus optical assembly connected at least indirectly to one of the first and second holder.

18. The system according to claim 13, further comprising:
a third tubular member parallel to the optical axis and comprising a third holder, wherein the selection signal is indicative of a tubular member to be used, wherein the tubular member to be used is selected from the first, second and third tubular members; and
at least one prime focus optical assembly connected at least indirectly to the third holder.

19. The system according to claim 10, comprising a telescope adapter coupling tube enclosing said opening and projecting from said base support in an opposite direction to the direction through which the tubular members project therefrom, said telescope adapter coupling tube being made and arranged to couple with a front end of the telescope tube of the telescope.

20. The system according to claim 1, comprising a telescope adapter coupling barrel enclosing said opening and projecting from said base support in an opposite direction to the direction through which the tubular members project therefrom, said telescope adapter coupling barrel being made and arranged to couple with a back end of the telescope tube of the telescope.

21. The system according to claim 1, further comprising an automatic focus correction mechanism for correcting the focus of each optical device connected to at least the first and holders, allowing at all times an optimum focus to be provided and to send an actuation order to a motor for controlling a primary focus of the telescope.

22. The system according to claim 21, wherein said automatic focus correction mechanism comprises an electronic focus compensation unit made to capture individualized data on the focus of each of said optical devices, said electronic focus compensation unit including a processor and a memory storing instructions that when executed by the processor cause the processor to process said individualized captured data to calibrate the optimum focus at all times for each optical device, and to send an actuation order to a primary focus control motor of the telescope in order to carry out said calibration.

23. An apparatus for operating with a telescope made to view distant objects, wherein the apparatus comprises:
first and second universal electronic exchange systems respectively made to couple to a back end and a front end of a telescope tube of the telescope, wherein each of said first and second universal electronic exchange systems comprises:
an automated rotary device comprising:
a base support provided with an opening alignable with an optical axis of the telescope;
a revolver-type rotary plate coupled on the base support;
a first tubular member comprising:
a first holder for an eyepiece or a lens;
a second tubular member comprising
a second holder for an eyepiece or a lens;
wherein the first and second tubular members are parallel to the optical axis;
an electric motor connected to the revolver-type rotary plate for transmission of a rotary movement to the revolver-type rotary plate; and
an electronic unit for tubular-member selection, wherein the electronic unit is made and arranged to:
receive a selection signal indicative of a tubular member to be used, wherein the tubular member to be used is selected from the first and second tubular members, wherein the selection signal is used for controlling rotation and stopping of the revolver-type rotary plate;
process a speed, angular path of rotation and stopping position of the tubular member to be used; and
send a command signal to the electric motor of the revolver-type rotary plate for positioning and aligning the tubular member to be used with the optical axis;
and wherein both electronic units are electrically and operatively connected to operate cooperatively to synchronize at least the emission of the respective command signals.

24. A telescope made to view distant objects, comprising:
at least one universal electronic exchange system, the universal electronic exchange system comprising:
an automated rotary device comprising:
a base support provided with an opening alignable with an optical axis of a telescope;
a revolver-type rotary plate coupled on the base support;
a first tubular member comprising:
a first holder for an eyepiece or a lens;
a first optical device connected at least indirectly to the first holder;
a second tubular member comprising
a second holder for an eyepiece or a lens;
a second optical device connected at least indirectly to the second holder;
wherein said second optical device is different from the first optical device;
wherein at least one of the first and the second optical devices is not a lens;
wherein the first and second tubular members are parallel to the optical axis;
wherein the first tubular member and the second tubular member extend from different locations of an upper face of the revolver-type rotary plate and are not relatively movable with respect to each other, so that for all positions adoptable by the revolver-type rotary plate:
the longitudinal axis of the first tubular member and the longitudinal axis of the second tubular member are not mutually aligned; and
the optical axis of the first optical device and the optical axis of the second optical device are not mutually aligned;
an electric motor connected to the revolver-type rotary plate for transmission of a rotary movement to the revolver-type rotary plate; and
an electronic unit for tubular-member selection, wherein the electronic unit is made and arranged to:
receive a selection signal indicative of a tubular member to be used, wherein the tubular member to be used is selected from the first and second tubular members, only one at a time, wherein the selection signal is used for controlling rotation and stopping of the revolver-type rotary plate;
process a speed, angular path of rotation and stopping position of the tubular member to be used; and
send a command signal to the electric motor of the revolver-type rotary plate for positioning and aligning the tubular member to be used with the optical axis.

* * * * *